United States Patent
Yoshida et al.

(10) Patent No.: US 8,587,729 B2
(45) Date of Patent: Nov. 19, 2013

(54) RECEIVER

(75) Inventors: Toshikazu Yoshida, Kanagawa (JP); Hideaki Ozawa, Chiba (JP); Mitsuru Ikeda, Tokyo (JP); Hidetoshi Kurihara, Kanagawa (JP); Koji Yoshida, Chiba (JP); Masaru Shimanuki, Kanagawa (JP); Tadashi Imai, Chiba (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 13/382,691

(22) PCT Filed: Jul. 9, 2010

(86) PCT No.: PCT/JP2010/061657
§ 371 (c)(1),
(2), (4) Date: Jan. 6, 2012

(87) PCT Pub. No.: WO2011/007718
PCT Pub. Date: Jan. 20, 2011

(65) Prior Publication Data
US 2012/0113324 A1    May 10, 2012

(30) Foreign Application Priority Data

| Jul. 13, 2009 | (JP) | 2009-165148 |
| Jul. 13, 2009 | (JP) | 2009-165149 |
| Jul. 13, 2009 | (JP) | 2009-165150 |

(51) Int. Cl.
*H04N 5/00* (2011.01)
*H04N 5/50* (2006.01)
*H04B 1/10* (2006.01)
*H04B 1/16* (2006.01)

(52) U.S. Cl.
USPC ........... 348/725; 348/607; 348/731; 455/303; 455/334

(58) Field of Classification Search
USPC .......... 348/607, 725; 455/272, 303, 307, 310, 455/334
See application file for complete search history.

(56) References Cited

U.S. PATENT DOCUMENTS

| 5,227,863 | A | * | 7/1993 | Bilbrey et al. | 348/578 |
| 5,475,876 | A | * | 12/1995 | Terada et al. | 455/301 |
| 6,040,851 | A | * | 3/2000 | Cheng et al. | 725/132 |
| 6,177,964 | B1 | * | 1/2001 | Birleson et al. | 348/725 |
| 6,377,316 | B1 | * | 4/2002 | Mycynek et al. | 348/731 |
| 6,731,349 | B1 | * | 5/2004 | Van Der Wijst | 348/732 |
| 6,741,293 | B1 | * | 5/2004 | Obuchi | 348/554 |
| 6,757,029 | B2 | * | 6/2004 | Kurihara | 348/731 |

(Continued)

FOREIGN PATENT DOCUMENTS

| JP | 2007-116358 A | 5/2007 |
| WO | WO 2006/109477 A1 | 10/2006 |

*Primary Examiner* — Brian Yenke
(74) *Attorney, Agent, or Firm* — Sony Corporation

(57) ABSTRACT

The present invention relates to a receiver capable of reducing influence of disturbance waves and capable of receiving analog and digital broadcast signals without interference with a single front end module, without leading to complexity of the configuration.

A receiver 10 includes, on a module board 11, a first terrestrial wave tuner 16 and second terrestrial wave tuner 17 which receive broadcast signals of a first frequency band, and a first satellite wave tuner 14 which receives broadcast signals of a second frequency band different from the first frequency band, with the first satellite wave tuner 14 being situated between the first terrestrial wave tuner 16 and the second terrestrial wave tuner 17. The present invention can be applied to receivers receiving broadcast signals of different frequency bands, for example.

44 Claims, 17 Drawing Sheets

(56) References Cited

U.S. PATENT DOCUMENTS

| | | |
|---|---|---|
| 6,760,079 B2* | 7/2004 | Morisada ............... 348/731 |
| 6,925,291 B2* | 8/2005 | Pugel ................... 455/191.1 |
| 7,061,542 B1* | 6/2006 | Ikeguchi ................ 348/558 |
| 7,092,042 B2* | 8/2006 | Ikeguchi ................ 348/725 |
| 7,298,426 B2* | 11/2007 | Yamamoto ............ 348/731 |
| 7,405,772 B2* | 7/2008 | Yukiyoshi ............. 348/732 |
| 7,414,676 B2* | 8/2008 | Lindstrom et al. .... 348/731 |
| 7,876,383 B2* | 1/2011 | Seo ....................... 348/732 |
| 7,924,348 B2* | 4/2011 | Goldblatt et al. ..... 348/731 |
| 7,944,510 B2* | 5/2011 | Lee et al. .............. 348/725 |
| 2002/0085126 A1* | 7/2002 | Matsumoto et al. .... 348/726 |
| 2003/0132455 A1* | 7/2003 | Utsunomiya et al. ... 257/200 |
| 2003/0227574 A1* | 12/2003 | Englmeier ............. 348/731 |
| 2004/0169775 A1* | 9/2004 | Yamamoto ............. 348/836 |
| 2005/0009481 A1* | 1/2005 | Bushner ................. 455/132 |
| 2005/0070235 A1* | 3/2005 | Matsuura ............... 455/131 |
| 2005/0116774 A1* | 6/2005 | Fanous et al. .......... 330/124 R |
| 2005/0195335 A1* | 9/2005 | Gomez et al. ......... 348/707 |
| 2006/0026657 A1* | 2/2006 | Kuhlmann et al. .... 725/100 |
| 2007/0118859 A1* | 5/2007 | Tsukahara et al. ..... 725/68 |
| 2008/0106651 A1* | 5/2008 | Goyal et al. ........... 348/726 |
| 2008/0198269 A1* | 8/2008 | Gomez ................... 348/707 |
| 2009/0055870 A1 | 2/2009 | Horibe |

* cited by examiner

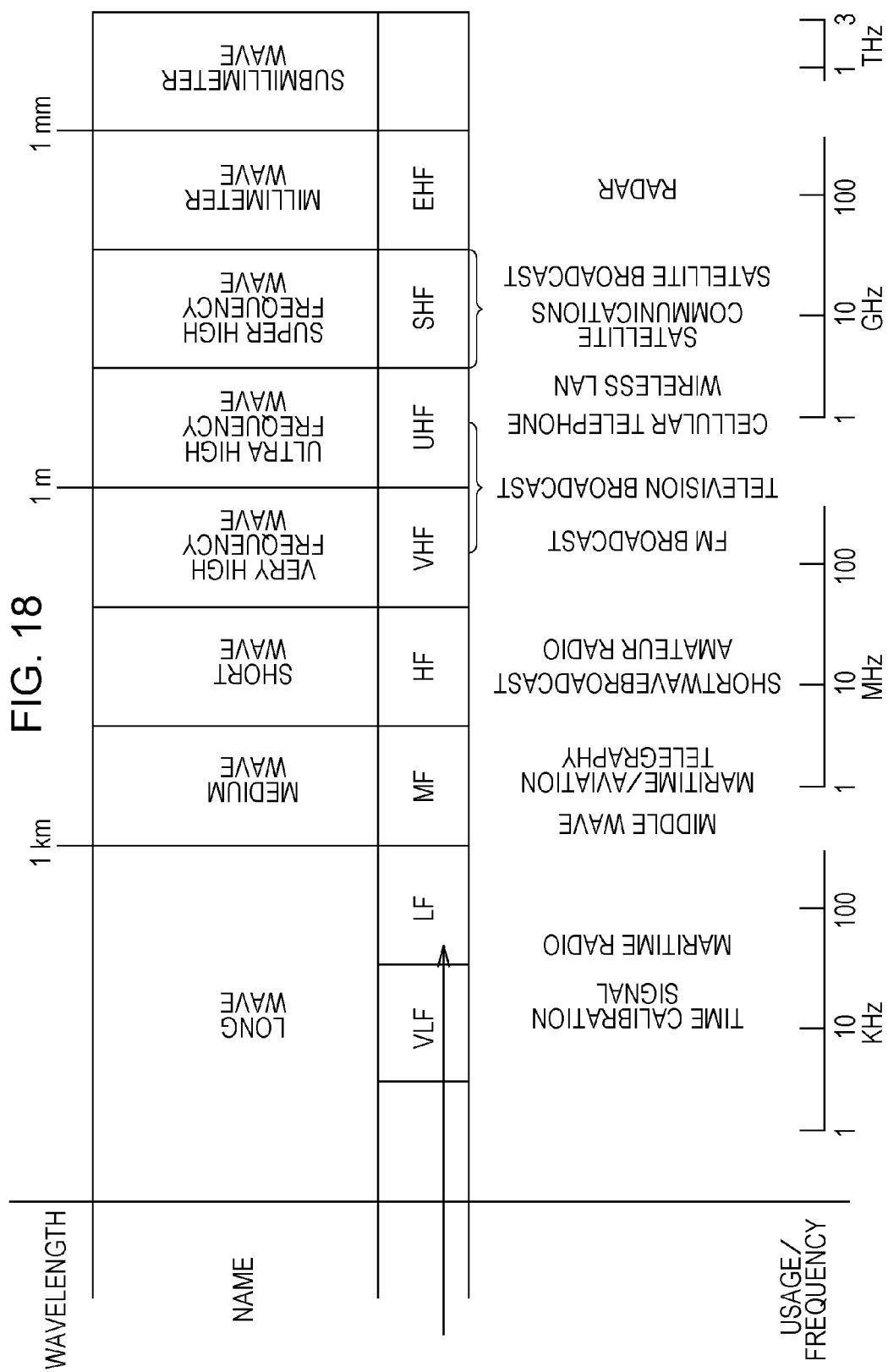

RECEIVER

CROSS REFERENCES TO RELATED APPLICATIONS

The present invention is the National Stage of International Application No. PCT/JP2010/061657, filed in the Japanese Patent Office as a Receiving Office on Jul. 9, 2010, which claims the priority benefit of Japanese Patent Application Numbers 2009-165150 and 2009-165148 and 2009-165149, filed in the Japanese Patent Office on Jul. 13, 2009, which are hereby incorporated by reference to the maximum extent allowable by law.

TECHNICAL FIELD

The present invention relates to a receiver configuring a front end module which receives analog television broadcast signals and digital television broadcast signals.

BACKGROUND ART

In recent years, terrestrial wave analog television broadcasting, terrestrial wave digital television broadcasting, and satellite wave digital television broadcasting have come to be transmitted at the same time, and there has arisen need to simultaneously view or simultaneously record two channels with a combination of various broadcast waves.

Also, in the case of a recording device, there is the need to output television broadcast signals which are RF signals, from a signal output terminal to yet another module.

In a case of realizing these, a configuration is made where one splitter module and two or three front end modules are separately provided each (e.g., PTL 1). Also, this front end module has a circuit for supplying power to a tuner module which receives analog television broadcasting and digital television broadcasting, with a board separate from that for the tuner module.

PTL 2 describes a digital broadcast receiver having multiple tuners.

CITATION LIST

Patent Literature

PTL 1: Japanese Unexamined Patent Application Publication No. 2007-116358
PTL 2: PCT Publication WO/2006/109477

SUMMARY OF INVENTION

Technical Problem

Now, with the technique disclosed in PTL 1, there is the need for one splitter module and two or three front end modules to be separately provided each. Also, the tuner module and the circuit which supplies power to the tuner module are provided with separate boards. However, this increases the number of parts, leading to a complicated configuration, and also there is the disadvantage that there is restriction in the space for assembling parts within the receiver.

In the event of including multiple television tuners as with PTL 2, obstruction among television tunes often is problematic. For example, there may be cases where the local frequency of one television tuner overlaps with the desired frequency band of another television tuner. Particularly, regarding disturbance waves coming in through signal lines, if within the reception band, the signal level of the disturbance waves depend on the isolation of the splitter devices. Analog broadcasting is extremely sensitive as to the level where disturbance waves can be detected as a beat, and there is the need to reduce the influence of disturbance waves as much as possible.

It is an object of the present invention to provide a receiver capable of reducing the influence of disturbance waves and capable of receiving analog and digital broadcast signals without interference with a single front end module.

Solution to Problem

A receiver according to an aspect of the present invention includes: first and second reception units configured to receive broadcast signals of a first frequency band; and a third reception unit configured to receive broadcast signals of a second frequency band different from the first frequency band; wherein the third reception unit is disposed between the first and second reception units.

A plurality of the third reception units may be disposed between the first and second reception units.

The first through third reception units may perform frequency conversion of received broadcast signals.

First and second intermediate disposition reception units may be disposed between the first and second reception units as two the third reception units; with the first and second reception units receiving terrestrial wave broadcast signals of UHF or VHF frequency bands, as broadcast signals of the first frequency band, and performing frequency conversion thereof to intermediate frequency signals; and with the first and second intermediate disposition reception units receiving satellite wave digital broadcast signals of SHF frequency bands, as broadcast signals of the second frequency band, and performing frequency conversion thereof to baseband signals.

The receiver may further include: a first input terminal to which satellite wave digital broadcast signals are input; a second input terminal to which analog or digital terrestrial wave broadcast signals are input; a first output terminal configured to output satellite wave digital broadcast signals input from the first input terminal; a second output terminal configured to output terrestrial wave broadcast signals input from the second input terminal; a first splitter unit configured to split the satellite wave digital broadcast signals input from the first input terminal into first satellite wave broadcast signals and second satellite wave broadcast signals, and also supply the input satellite wave digital broadcast signals to the first output terminal; and a second splitter unit configured to split the terrestrial wave broadcast signals input from the second input terminal into first terrestrial wave broadcast signals and second terrestrial wave broadcast signals, and also supply the input terrestrial wave digital broadcast signals to the second output terminal; with the first intermediate disposition reception unit receiving the first satellite wave broadcast signals split by the first splitter unit and performing frequency conversion thereof into first baseband signals; and with the second intermediate disposition reception unit receiving the second satellite wave broadcast signals split by the first splitter unit and performing frequency conversion thereof into second baseband signals; and with the first reception unit receiving the first terrestrial wave broadcast signals split by the second splitter unit and performing frequency conversion thereof into first intermediate frequency signals; and with the second reception unit receiving the second terrestrial wave broadcast signals split by the second splitter unit and performing frequency conversion thereof into second intermediate frequency signals.

The receiver may further include: a first demodulator having demodulation functions of the first baseband signals from the first intermediate disposition reception unit and the first intermediate frequency signals from the first reception unit and a second demodulator having demodulation functions of the second baseband signals from the second intermediate disposition reception unit and the second intermediate frequency signals from the second reception unit.

The first demodulator may have digital demodulation and analog demodulation functions; functions for demodulating video signals and audio signals of the first baseband signals to generate a first transport stream; functions for demodulating, in the event that the first intermediate frequency signals are signals where terrestrial wave digital broadcast signals have been frequency-converted, video signals and audio signals of the first intermediate frequency signals, to generate a second transport stream; and functions for demodulating, in the event that the first intermediate frequency signals are signals where terrestrial analog broadcast signals have been frequency-converted, video signals and audio signals of the first intermediate frequency signals, to generate analog video signals and analog audio signals.

The second demodulator may have digital demodulation functions; functions for demodulating video signals and audio signals of the second baseband signals to generate a third transport stream; and functions for demodulating, in the event that the second intermediate frequency signals are signals where terrestrial wave digital broadcast signals have been frequency-converted, video signals and audio signals of the second intermediate frequency signals, to generate a fourth transport stream.

The receiver may further include: a third output terminal configured to output a transport stream generated at the first demodulator; a fourth output terminal configured to output a transport stream generated at the second demodulator; a fifth output terminal configured to output analog video signals generated at the first demodulator; and a sixth output terminal configured to output analog audio signals generated at the first demodulator; with the first demodulator supplying the first transport stream or the second transport stream that has been generated to the third output terminal, and supplying the generated analog video signals to the fifth output terminal and supplies the generated analog audio signals to the sixth output terminal.

The first intermediate disposition reception unit, the second intermediate disposition reception unit, the first reception unit and the second reception unit may be arrayed in parallel as to the split output of the first splitter unit and the second splitter unit, arrayed with the first reception unit and the second reception unit which perform frequency conversion of the terrestrial wave broadcast signals disposed on the outer side of the parallel array, and arrayed with the first intermediate disposition reception unit and the intermediate disposition reception unit arrayed in parallel between the disposed portion of the first reception unit and the disposed portion of the second reception unit.

The first intermediate disposition reception unit, the second intermediate disposition reception unit, the first reception unit and the second reception unit, to be disposed in parallel, may be disposed in the order of, from one outer side disposition portion, the first reception unit, the first intermediate disposition reception unit, the second intermediate disposition reception unit and the second reception unit.

The first demodulator and the second demodulator may be disposed in parallel as to the output of the first reception unit, the first intermediate disposition reception unit, the second intermediate disposition reception unit and the second reception unit, which are arrayed in parallel; with the first reception unit and the first intermediate disposition reception unit being arrayed in parallel such that the output sides face the input side of the first demodulator; and with the second intermediate disposition reception unit and the second reception unit being arrayed in parallel such that the output sides face the input side of the second demodulator.

The first intermediate disposition reception unit, the second intermediate disposition reception unit, the first reception unit and the second reception unit, to be disposed in parallel, may be disposed in the order of, from one outer side disposition portion, the first reception unit, the second intermediate disposition reception unit, the first intermediate disposition reception unit and the second reception unit.

The first demodulator and the second demodulator may be disposed in parallel as to the output of the first reception unit, the second intermediate disposition reception unit, the first intermediate disposition reception unit and the second reception unit, which are arrayed in parallel; with the first reception unit and the second intermediate disposition reception unit being arrayed in parallel such that the output sides face the input side of the first demodulator; and with the first intermediate disposition reception unit and the second reception unit being arrayed in parallel such that the output sides face the input side of the second demodulator.

The first splitter unit may include a filter configured to remove spurious components of satellite wave digital broadcast signals input from the first input terminal, an amplifier configured to amplify output signals from the filter, and a splitter device configured to split output signals from the amplifier into the first satellite wave broadcast signals, the second satellite wave broadcast signals, and output satellite wave digital broadcast signals, the splitter device supplying the first satellite wave broadcast signals to the first intermediate disposition reception unit, supplying the second satellite wave broadcast signals to the second intermediate disposition reception unit and supplying the output satellite wave digital broadcast signals to the first output terminal.

The first splitter unit may include a filter configured to remove spurious components of satellite wave digital broadcast signals input from the first input terminal, a first splitter device configured to split output signals from the filter into two satellite wave broadcast signals, an amplifier configured to amplify one of the satellite wave digital broadcast signals split at the first splitter device, and a second splitter device configured to split output signals from the amplifier into the first satellite wave broadcast signals and the second satellite wave broadcast signals, the first splitter device supplying the split other satellite wave broadcast signals to the first output terminal, and the second splitter device supplying the first satellite wave broadcast signals to the first intermediate disposition reception unit, and supplying the second satellite wave broadcast signals to the second intermediate disposition reception unit.

The second splitter unit may include a filter configured to remove spurious components of terrestrial wave broadcast signals input from the second input terminal, an amplifier configured to amplify output signals from the filter, and a splitter device configured to split output signals from the amplifier into the first terrestrial wave broadcast signals, the second terrestrial wave broadcast signals, and output terrestrial wave broadcast signals, the splitter device supplying the first terrestrial wave broadcast signals to the first reception unit, supplying the second terrestrial wave broadcast signals to the second reception unit and supplying the output terrestrial wave broadcast signals to the second output terminal.

The second splitter unit may include a filter configured to remove spurious components of terrestrial wave broadcast signals input from the second input terminal, a third splitter device configured to split output signals from the filter into two terrestrial wave broadcast signals, an amplifier configured to amplify one of the terrestrial wave broadcast signals split at the third splitter device, and a fourth splitter device configured to split output signals from the amplifier into the first terrestrial wave broadcast signals and the second terrestrial wave broadcast signals, the third splitter device supplying the split other terrestrial wave broadcast signals to the second output terminal, and the fourth splitter device supplying the first terrestrial wave broadcast signals to the first reception unit and supplying the second terrestrial wave broadcast signals to the second reception unit.

The first through third reception means may be arrayed in parallel on a module board; with the first and second reception means being arrayed on edge portion side of the module board.

The receiver may further include: a tuner module unit having the first through third reception units, and a demodulator configured to demodulate video signals and audio signals from signals after frequency conversion at the first through third reception units; and a power supply unit configured to supply driving power to the tuner module unit; with the tuner module unit and the power supply unit being disposed on a single board in a secluded manner; and with the power supply unit including a plurality of regulators capable of supplying driving power to at least the first through third reception units, and being capable of selectively supplying driving power to reception units corresponding to the plurality of regulators, in accordance with received broadcast signals.

The receiver may further include: a first input terminal to which satellite wave digital broadcast signals are input; and a second input terminal to which analog or digital terrestrial wave broadcast signals are input; with the third reception unit being configured of first and second intermediate disposition reception units; and with the tuner module including a first splitter unit configured to split the satellite wave digital broadcast signals input from the first input terminal into first satellite wave broadcast signals and second satellite wave broadcast signals, a second splitter unit configured to split the terrestrial wave broadcast signals input from the second input terminal into first terrestrial wave broadcast signals and second terrestrial wave broadcast signals, a first intermediate disposition reception unit configured to receive the first satellite wave broadcast signals split by the first splitter unit and perform frequency conversion thereof into first baseband signals, a second intermediate disposition reception unit configured to receive the second satellite wave broadcast signals split by the first splitter unit and perform frequency conversion thereof into second baseband signals, a first reception unit configured to receive the first terrestrial wave broadcast signals split by the second splitter unit and perform frequency conversion thereof into first intermediate frequency signals, a second reception unit configured to receive the second terrestrial wave broadcast signals split by the second splitter unit and perform frequency conversion thereof into second intermediate frequency signals, a first demodulator having demodulation functions of the first baseband signals from the first intermediate disposition reception unit and the first intermediate frequency signals from the first reception unit, and a second demodulator having demodulation functions of the second baseband signals from the second intermediate disposition reception unit and the second intermediate frequency signals from the second reception unit, and with the power supply unit being capable of selectively supplying driving power to the first intermediate disposition reception unit, the second intermediate disposition reception unit, the first reception unit, and the second reception unit.

The power supply unit may be capable of selectively supplying driving power in common to a plurality of reception units of the first intermediate disposition reception unit, the second intermediate disposition reception unit, the first reception unit, and the second reception unit, and have functions of holding in a sleep state, of the plurality of reception units to which driving power is supplied in common, frequency conversion units in a non-processing state as to received broadcast waves.

The first splitter unit may include a first amplifier configured to amplify satellite wave digital broadcast signals input from the first input terminal, with the second splitter unit including a second amplifier configured to amplify terrestrial wave broadcast signals input from the second input terminal, and with the power supply unit being capable of selectively supplying driving power to the first amplifier and the second amplifier in accordance with received broadcast signals.

The receiver may further include: a first output terminal configured to output satellite wave digital broadcast signals input from the first input terminal; and a second output terminal configured to output terrestrial wave broadcast signals input from the second input terminal; with the first splitter unit splitting satellite wave digital broadcast signals input from the first input terminal into first satellite wave broadcast signals and second satellite wave broadcast signals, and supplying the input satellite wave digital broadcast signals to the first output terminal; and with the second splitter unit splitting terrestrial wave broadcast signals input from the second input terminal into first terrestrial wave broadcast signals and second terrestrial wave broadcast signals, and supplying the input terrestrial wave broadcast signals to the second output terminal.

The first demodulator may have digital demodulation and analog demodulation functions, functions for demodulating video signals and audio signals of the first baseband signals to generate a first transport stream, functions for demodulating, in the event that the first intermediate frequency signals are signals where terrestrial wave digital broadcast signals have been frequency-converted, video signals and audio signals of the first intermediate frequency signals, to generate a second transport stream, and functions for demodulating, in the event that the first intermediate frequency signals are signals where terrestrial analog broadcast signals have been frequency-converted, video signals and audio signals of the first intermediate frequency signals, to generate analog video signals and analog audio signals; with the second demodulator having digital demodulation functions, functions for demodulating video signals and audio signals of the second baseband signals to generate a third transport stream; and functions for demodulating, in the event that the second intermediate frequency signals are signals where terrestrial wave digital broadcast signals have been frequency-converted, video signals and audio signals of the second intermediate frequency signals, to generate a fourth transport stream.

The receiver may further include: a third output terminal configured to output a transport stream generated at the first demodulator; a fourth output terminal configured to output a transport stream generated at the second demodulator; a fifth output terminal configured to output analog video signals generated at the first demodulator; and a sixth output terminal configured to output analog audio signals generated at the first demodulator; with the first demodulator supplying the first transport stream or the second transport stream that has been generated to the third output terminal, and supplying the generated analog video signals to the fifth output terminal and supplies the generated analog audio signals to the sixth output terminal.

The first intermediate disposition reception unit, the second intermediate disposition reception unit, the first reception unit and the second reception unit may be arrayed in parallel as to the split output of the first splitter unit and the second splitter unit, arrayed with the first reception unit and the second reception unit which perform frequency conversion of the terrestrial wave broadcast signals disposed on the outer side of the parallel array, and arrayed with the first intermediate disposition reception unit and the second intermediate disposition reception unit arrayed in parallel between the disposed portion of the first reception unit and the disposed portion of the second reception unit.

The first intermediate disposition reception unit, the second intermediate disposition reception unit, the first reception unit and the second reception unit, to be disposed in parallel, may be disposed in the order of, from one outer side disposition portion, the first reception unit, the first intermediate disposition reception unit, the second intermediate disposition reception unit and the second reception unit.

The first demodulator and the second demodulator may be disposed in parallel as to output of the first reception unit, the first intermediate disposition reception unit, the second intermediate disposition reception unit and the second reception unit, which are arrayed in parallel; with the first reception unit and the first intermediate disposition reception unit being arrayed in parallel such that the output sides face the input side of the first demodulator; and with the second intermediate disposition reception unit and the second reception unit being arrayed in parallel such that the output sides face the input side of the second demodulator.

The first intermediate disposition reception unit, the second intermediate disposition reception unit, the first reception unit and the second reception unit, to be disposed in parallel, may be disposed in the order of, from one outer side disposition portion, the first reception unit, the second intermediate disposition reception unit, the first intermediate disposition reception unit and the second reception unit.

The first demodulator and the second demodulator may be disposed in parallel as to output of the first reception unit, the second intermediate disposition reception unit, the first intermediate disposition reception unit and the second reception unit, which are arrayed in parallel; with the first reception unit and the second intermediate disposition reception unit being arrayed in parallel such that the output sides face the input side of the first demodulator; and with the first intermediate disposition reception unit and the second reception unit being arrayed in parallel such that the output sides face the input side of the second demodulator.

The first splitter unit may include a filter configured to remove spurious components of satellite wave digital broadcast signals input from the first input terminal, a first amplifier configured to amplify output signals from the filter, and a splitter device configured to split output signals from the first amplifier into the first satellite wave broadcast signals, the second satellite wave broadcast signals, and output satellite wave digital broadcast signals, the splitter device supplying the first satellite wave broadcast signals to the first intermediate disposition reception unit, supplying the second satellite wave broadcast signals to the second intermediate disposition reception unit and supplying the output satellite wave digital broadcast signals to the first output terminal.

The first splitter unit may include a filter configured to remove spurious components of satellite wave digital broadcast signals input from the first input terminal, a first splitter device configured to split output signals from the filter into two satellite wave broadcast signals, a first amplifier configured to amplify one of the satellite wave digital broadcast signals split at the first splitter device, and a second splitter device configured to split output signals from the first amplifier into the first satellite wave broadcast signals and the second satellite wave broadcast signals, the first splitter device supplying the split other satellite wave broadcast signals to the first output terminal, and the second splitter device supplying the first satellite wave broadcast signals to the first intermediate disposition reception unit, supplying the second satellite wave broadcast signals to the second intermediate disposition reception unit.

The second splitter unit may include a filter configured to remove spurious components of terrestrial wave broadcast signals input from the second input terminal, a second amplifier configured to amplify output signals from the filter, and a splitter device configured to split output signals from the second amplifier into the first terrestrial wave broadcast signals, the second terrestrial wave broadcast signals, and output terrestrial wave broadcast signals, the splitter device supplying the first terrestrial wave broadcast signals to the first reception unit, supplying the second terrestrial wave broadcast signals to the second reception unit and supplying the output terrestrial wave broadcast signals to the second output terminal.

The second splitter unit may include a filter configured to remove spurious components of terrestrial wave broadcast signals input from the second input terminal, a third splitter device configured to split output signals from the filter into two terrestrial wave broadcast signals, a second amplifier configured to amplify one of the terrestrial wave broadcast signals split at the third splitter device, and a fourth splitter device configured to split output signals from the second amplifier into the first terrestrial wave broadcast signals and the second terrestrial wave broadcast signals, the third splitter device supplying the split other terrestrial wave broadcast signals to the second output terminal, and the fourth splitter device supplying the first terrestrial wave broadcast signals to the first reception unit and supplying the second terrestrial wave broadcast signals to the second reception unit.

The receiver may further include: a splitter unit configured to split input broadcast signals into a plurality of broadcast signals; a tuner unit having first through third reception units which receive each of the plurality of broadcast signals split at the splitter unit and perform frequency conversion; and an isolation amp unit disposed on at least one of a plurality of signal lines which propagate broadcast signals split at the splitter unit to corresponding reception units; the isolation amp unit having a buffer amp formed of a transistor where broadcast signals split at the splitter unit are input to a control terminal, and low-impedance output is performed by impedance transform.

The isolation amp unit may have an attenuator disposed on at least one of the input side and output side of the buffer amp.

The receiver may further include: a first input terminal to which satellite wave digital broadcast signals are input; a second input terminal to which analog or digital terrestrial wave broadcast signals are input; a first output terminal configured to output satellite wave digital broadcast signals input from the first input terminal; and a second output terminal configured to output terrestrial wave broadcast signals input from the second input terminal; with the splitter unit including a first splitter unit configured to split the satellite wave digital broadcast signals input from the first input terminal into first satellite wave broadcast signals and second satellite wave broadcast signals, and also supply the input satellite wave digital broadcast signals to the first output terminal, and a second splitter unit configured to split the terrestrial wave broadcast signals input from the second input terminal into first terrestrial wave broadcast signals and second terrestrial wave broadcast signals, and also supply the input terrestrial wave digital broadcast signals to the second output terminal; and with the third reception unit being configured of first and second intermediate disposition reception units; and with the tuner unit including a first intermediate disposition reception unit configured to receive, via a first signal line, the first satellite wave broadcast signals split by the first splitter unit and perform frequency conversion thereof into first baseband signals, a second intermediate disposition reception unit configured to receive, via a second signal line, the second satellite wave broadcast signals split by the first splitter unit and perform frequency conversion thereof into second baseband signals, a first reception unit configured to receive, via a third signal line, the first terrestrial wave broadcast signals split by the second splitter unit and perform frequency conversion thereof into first intermediate frequency signals, a second reception unit configured to receive, via a fourth signal line, the second terrestrial wave broadcast signals split by the second splitter unit and perform frequency conversion thereof into second intermediate frequency signals; and with the isolation amp unit being disposed on at least one of the third signal line and the fourth signal line connected to at least the second splitter unit, of the first splitter unit and the second splitter unit.

The second splitter unit may include a filter configured to remove spurious components of terrestrial wave broadcast signals input from the second input terminal, a first splitter device configured to split output signals from the filter into two terrestrial wave broadcast signals, an amplifier configured to amplify one of the terrestrial wave broadcast signals split at the first splitter device, and a second splitter device configured to split output signals from the amplifier into the first terrestrial wave broadcast signals and the second terrestrial wave broadcast signals, the first splitter device supplying the split other terrestrial wave broadcast signals to the second output terminal, and the second splitter device supplying the first terrestrial wave broadcast signals to the first reception unit via the third signal line, and supplying the second terrestrial wave broadcast signals to the second reception unit via the fourth signal line.

The first splitter unit may include a filter configured to remove spurious components of satellite wave digital broadcast signals input from the first input terminal, an amplifier configured to amplify output signals from the filter, and a splitter device configured to split output signals from the amplifier into the first satellite wave broadcast signals, the second satellite wave broadcast signals, and output satellite wave digital broadcast signals, the splitter device supplying the first satellite wave broadcast signals to the first intermediate disposition reception unit via the first signal line, supplying the second satellite wave broadcast signals to the second intermediate disposition reception unit via the second signal line, and supplying the output satellite wave digital broadcast signals to the first output terminal.

The first splitter unit may include a filter configured to remove spurious components of satellite wave digital broadcast signals input from the first input terminal, a third splitter device configured to split output signals from the filter into two satellite wave broadcast signals, an amplifier configured to amplify one of the satellite wave digital broadcast signals split at the third splitter device, and a fourth splitter device configured to split output signals from the amplifier into the first satellite wave broadcast signals and the second satellite wave broadcast signals, the third splitter device supplying the split other satellite wave broadcast signals to the first output terminal, and the second splitter device supplying the first satellite wave broadcast signals to the first intermediate disposition reception unit via the first signal line, supplying the second satellite wave broadcast signals to the second intermediate disposition reception unit via the second signal line.

The tuner unit may include a first demodulator having demodulation functions of the first baseband signals from the first intermediate disposition reception unit and the first intermediate frequency signals from the first reception unit and a second demodulator having demodulation functions of the second baseband signals from the second intermediate disposition reception unit and the second intermediate frequency signals from the second reception unit; the first demodulator having digital demodulation and analog demodulation functions, functions for demodulating video signals and audio signals of the first baseband signals to generate a first transport stream, functions for demodulating, in the event that the first intermediate frequency signals are signals where terrestrial wave digital broadcast signals have been frequency-converted, video signals and audio signals of the first intermediate frequency signals, to generate a second transport stream, and functions for demodulating, in the event that the first intermediate frequency signals are signals where terrestrial analog broadcast signals have been frequency-converted, video signals and audio signals of the first intermediate frequency signals, to generate analog video signals and analog audio signals, and the second demodulator having digital demodulation functions, functions for demodulating video signals and audio signals of the second baseband signals to generate a third transport stream, and functions for demodulating, in the event that the second intermediate frequency signals are signals where terrestrial wave digital broadcast signals have been frequency-converted, video signals and audio signals of the second intermediate frequency signals, to generate a fourth transport stream.

The receiver may further include: a third output terminal configured to output a transport stream generated at the first demodulator; a fourth output terminal configured to output a transport stream generated at the second demodulator; a fifth output terminal configured to output analog video signals generated at the first demodulator; and a sixth output terminal configured to output analog audio signals generated at the first demodulator; with the first demodulator supplying the first transport stream or the transport stream that has been generated to the third output terminal, and supplying the generated analog video signals to the fifth output terminal and supplies the generated analog audio signals to the sixth output terminal.

The first intermediate disposition reception unit, the second intermediate disposition reception unit, the first reception unit and the second reception unit may be arrayed in parallel as to the split output of the first splitter unit and the second splitter unit, arrayed with the first reception unit and the second reception unit which perform frequency conversion of the terrestrial wave broadcast signals disposed on the outer side of the parallel array, and arrayed with the first intermediate disposition reception unit and the second intermediate disposition reception unit arrayed in parallel between the disposed portion of the first reception unit and the disposed portion of the second reception unit.

The first intermediate disposition reception unit, the second intermediate disposition reception unit, the first reception unit and the second reception unit, to be disposed in parallel, may be disposed in the order of, from one outer side disposition portion, the first reception unit, the first intermediate disposition reception unit, the second intermediate disposition reception unit and the second reception unit.

The first demodulator and the second demodulator may be disposed in parallel as to the output of the first reception unit, the first intermediate disposition reception unit, the second intermediate disposition reception unit and the second reception unit, which are arrayed in parallel; with the first reception unit and the first intermediate disposition reception unit being arrayed in parallel such that the output sides face the input side of the first demodulator; and with the second intermediate disposition reception unit and the second reception unit being arrayed in parallel such that the output sides face the input side of the second demodulator.

The first intermediate disposition reception unit, the second intermediate disposition reception unit, the first reception unit and the second reception unit, to be disposed in parallel, may be disposed in the order of, from one outer side disposition portion, the first reception unit, the second intermediate disposition reception unit, the first intermediate disposition reception unit and the second reception unit.

The first demodulator and the second demodulator may be disposed in parallel as to the output of the first reception unit, the second intermediate disposition reception unit, the first intermediate disposition reception unit and the second reception unit, which are arrayed in parallel; with the first reception unit and the second intermediate disposition reception unit being arrayed in parallel such that the output sides face the input side of the first demodulator; and with the first intermediate disposition reception unit and the second reception unit being arrayed in parallel such that the output sides face the input side of the second demodulator.

According to the present invention, between first and second reception units receiving broadcast signals of a first frequency band is disposed a third reception unit receiving broadcast signals of a second frequency band which is different from the first frequency band.

Advantageous Effects of Invention

According to the present invention, a receiver can be provided which is capable of reducing the influence of disturbance waves and is capable of receiving analog and digital broadcast signals without interference with a single front end module.

BRIEF DESCRIPTION OF DRAWINGS

FIG. 18 is a diagram for describing frequency bands.

DESCRIPTION OF EMBODIMENTS

Embodiments of the present invention will be described below in correlation with the drawings.

Note that description will proceed in the following order.
1. First Embodiment (First Configuration Example of Receiver)
2. Second Embodiment (Second Configuration Example of Receiver)
3. Third Embodiment (Third Configuration Example of Receiver)
4. Fourth Embodiment (Fourth Configuration Example of Receiver)

1. First Embodiment

Figure 1:
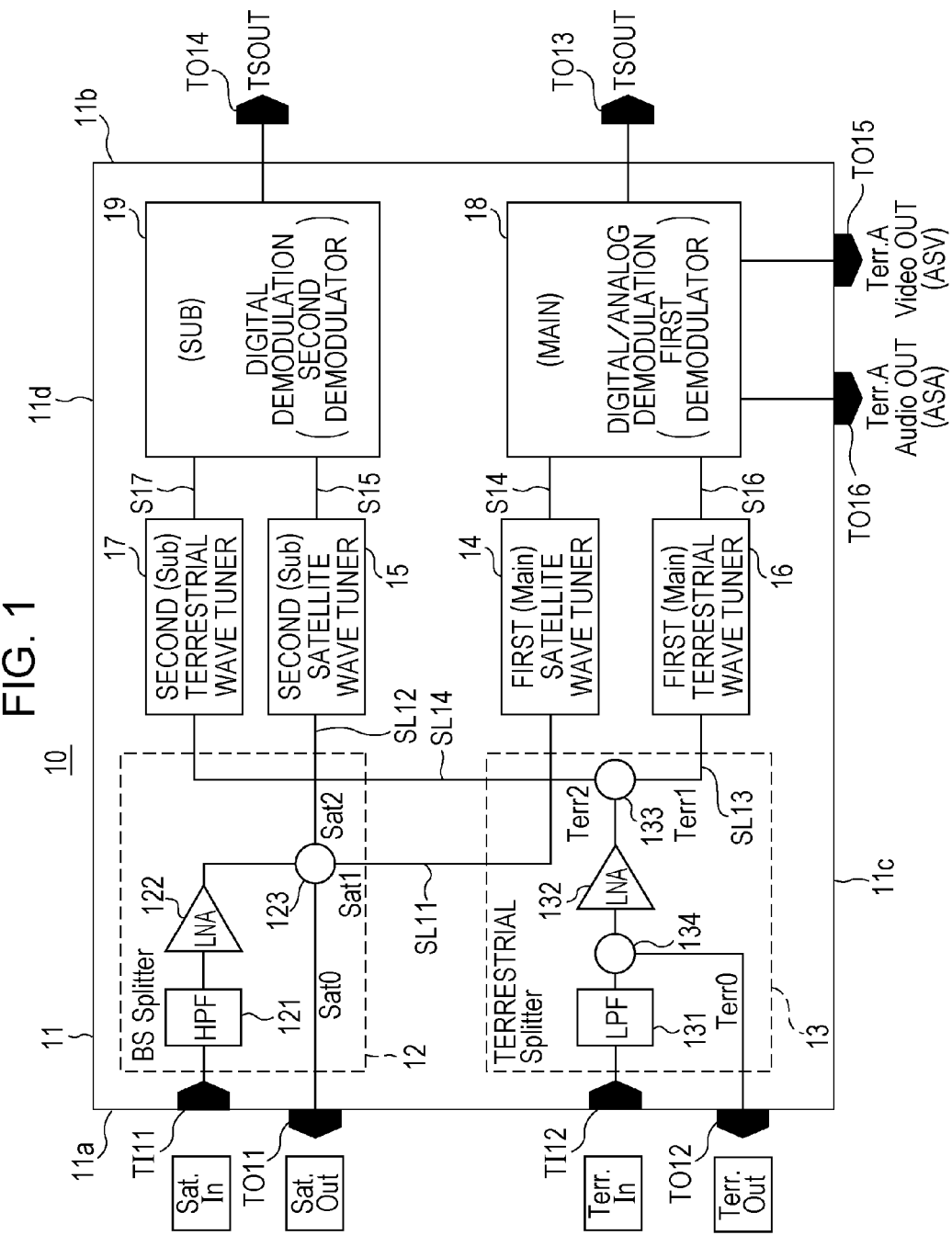
FIG. 1 is a diagram illustrating a configuration example of a broadcast signal receiver according to a first embodiment of the present invention.

FIG. 1 is a diagram illustrating a configuration example of a broadcast signal receiver according to a first embodiment of the present invention.

This receiver 10 is configured so as to be capable of receiving terrestrial wave analog television broadcasting, terrestrial wave digital television broadcasting, and satellite wave digital television broadcasting, with a single front end module, without interference between digital circuit and analog circuit. As for a configuration to enable reception of these multiple broadcasts at the same time with two channels, the receiver 10 employs a distinctive configuration including secluded placement of signal splitter unit, frequency converter, and demodulator, distanced placement of terrestrial wave frequency converters, and so forth. The receiver 10 also has shared filtering of terrestrial wave digital television broadcast and satellite wave digital television broadcast demodulated signal TS (transport stream) clock output, and shared GND of the digital circuit portion and analog circuit portion. Also, GND pattern design measures are implemented with the receiver 10, taking into consideration the return current flowing through the GND portion.

Specific configurations and functions of the receiver 10 will be described below. Note that in the following description, satellite wave digital television broadcast RF signals will be referred to as satellite wave digital television broadcast signals, and analog and digital terrestrial wave broadcast FR signals will be referred to as terrestrial wave broadcast signals. Also, as an example, the frequency band applied in the present embodiment are as follows. The VHF band is 30 MHz to 300 MHz, the UHF band is 300 MHz to 3 GHz, and the satellite band is 950 MHz to 2150 MHz.

The receiver 10 has the following function blocks disposed in a secluded manner on one module board 11. Formed in a secluded manner on the module board 11 are a first splitter unit 12, a second splitter unit 13, a first satellite wave tuner 14, a second satellite wave tuner 15, a first terrestrial wave tuner 16, a second terrestrial wave tuner 17, a digital/analog demodulator 18, and a digital demodulator 19. The first satellite wave tuner 14 serves as a first frequency converter, and the second satellite wave tuner 15 serves as a second frequency converter. The first terrestrial wave tuner 16 serves as a third frequency converter, and the second terrestrial wave tuner 17 serves as a fourth frequency converter. The digital/analog demodulator 18 functions as a first demodulator, and the digital demodulator 19 functions as a second demodulator.

The module board 11 is formed with a rectangular form. Formed on a first edge (side) portion 11*a* of the module board 11 are a first input terminal TI11, a second input terminal TI12, a first output terminal TO11, and a second output terminal TO12. With the module board 11, the first input terminal TI11 and first output terminal TO11 are formed in parallel in close proximity at the first edge portion 11*a* at the upper left side of FIG. 1. The first splitter unit 12 is also formed so as to face the position where the first input terminal TI11 and first output terminal TO11 are formed. With the module board 11, the second input terminal TI12 and second output terminal TO12 are formed in parallel in close proximity at the first edge portion 11*a* at the lower left side of FIG. 1. The second splitter unit 13 is also formed so as to face the position where the second input terminal TI12 and second output terminal TO12 are formed.

Satellite wave digital broadcast signals Sat are input to the first input terminal TI11, and these satellite wave digital broadcast signals Sat are input to the first splitter unit 12. The first output terminal TO11 is configured such that the satellite wave digital broadcast signals Sat input from the first input terminal TI11 to the first splitter unit 12 can be output to another module device. Terrestrial wave broadcast signals Terr are input to the second input terminal TI12, and these terrestrial wave broadcast signals Terr are input to the second splitter unit 13. The second output terminal TO12 is configured such that the terrestrial wave broadcast signals Terr input from the second input terminal TI12 to the second splitter unit 13 can be output to another module device.

A third output terminal TO13 and a fourth output terminal TO14 are formed at a second edge portion 11*b* facing the first edge portion 11*a* of the module board 11. A fifth output terminal TO15 and a sixth output terminal TO16 are formed at a third edge portion 11*c* of the module board 11, at a position near to the second edge portion 11*b*. With the module board 11, the third output terminal TO13 is formed on the lower side of the center portion of the second edge portion 11*b* to the right side in FIG. 1. With the module board 11, the fourth output terminal TO14 is formed on the upper side of the center portion of the second edge portion 11*b* to the right side in FIG. 1. With the module board 11, the fifth output terminal TO15 and sixth output terminal TO16 are formed in parallel in close proximity on the third edge portion 11*c* at a position close to the second edge portion 11*b*. At the lower right side of the module board 11 in FIG. 1, the digital/analog demodulator 18 serving as the first demodulator is situated in close proximity to the position where the third output terminal TO13, fifth output terminal TO15, and sixth output terminal TO16 are formed. At the upper right side of the module board 11 in FIG. 1, the digital demodulator 19 serving as the second demodulator is situated in close proximity to the position where the fourth output terminal TO14 is formed.

The third output terminal TO13 is disposed to output the TS (transport stream) generated at the digital/analog demodulator 18 serving as the first demodulator. The fourth output terminal TO14 is disposed to output the TS generated at the digital demodulator 19 serving as the second demodulator. The fifth output terminal TO15 is disposed to output analog video signals ASV generated at the digital/analog demodulator 18. The sixth output terminal TO16 is disposed to output analog audio signals ASA generated at the digital/analog demodulator 18.

The first splitter unit 12 splits the satellite wave digital broadcast signals Sat input from the first input terminal TI11 into first satellite wave broadcast signals Sat1 and second satellite wave broadcast signals Sat2, and supplies the input satellite wave digital broadcast signals Sat to the first output terminal TO11. The first splitter unit 12 supplies the first satellite wave broadcast signals Sat1 to the first satellite wave tuner 14 serving as the first frequency converter, via a first signal line SL11. The first splitter unit 12 supplies the split second satellite wave broadcast signals Sat2 to the second satellite wave tuner 15 serving as the second frequency converter via a second signal line SL12.

As shown in FIG. 1, the first splitter unit 12 has a high-pass filter (HPF) 121, a low-noise amplifier (LNA) 122, and a splitter device 123.

The HPF 121 removes the unnecessary components from the satellite wave digital broadcast signals Sat input from the first input terminal TI11, and outputs this to the LNA 122. That is to say, for example, the HPF 121 removes, of the frequency components of the satellite wave digital broadcast signals Sat input from the first input terminal TI11, low-frequency components below a predetermined frequency as unnecessary components, and outputs the high-frequency components equal to or above the predetermined frequency to the LNA 122. The LNA 122 amplifies the satellite wave digital broadcast signals Sat from which the unnecessary components have been removed at the HPF 121 and outputs to the splitter device 123. The splitter device 123 splits the satellite wave digital broadcast signals Sat output from the LNA 122 into first satellite wave broadcast signals Sat1, second satellite wave broadcast signals Sat2, and output satellite wave digital broadcast signals SatO. The splitter device 123 supplies the split first satellite wave broadcast signals Sat1 to the first satellite wave tuner 14 serving as the first frequency converter via the first signal line SL11. The splitter device 123 supplies the split second satellite wave broadcast signals Sat2 to the second satellite wave tuner 15 serving as the second frequency converter via the second signal line SL12. The splitter device 123 supplies the split output satellite wave digital broadcast signals SatO to the first output terminal TO11.

The second splitter unit 13 splits the terrestrial wave broadcast signals Terr input from the second input terminal TI12 into first terrestrial wave broadcast signals Terr1 and second terrestrial wave broadcast signals Terr2, and supplies the input terrestrial wave broadcast signals Terr to the second output terminal TO12. The second splitter unit 13 supplies the split first terrestrial wave broadcast signals Terr1 to the first terrestrial wave tuner 16 serving as the third frequency converter via a third signal line SL13. The second splitter unit 13 supplies the split second terrestrial wave broadcast signals Terr2 to the second terrestrial wave tuner 17 serving as the fourth frequency converter via a fourth signal line SL14.

As shown in FIG. 1, the second splitter unit 13 has a low-pass filter (SPF) 131, an LNA 132, and splitter devices 133 and 134. The splitter device 133 corresponds to a fourth splitter device, and the splitter device 134 corresponds to a third splitter device.

The LPF 131 removes the unnecessary components of the terrestrial wave broadcast signals Terr input from the second input terminal TO12 and outputs to the splitter device 134. That is to say, for example, the LPF 131 removes, of the frequency components of the satellite wave digital broadcast signals Sat input from the second input terminal TO12, high-frequency components equal to or above a predetermined frequency as unnecessary components, and outputs the low-frequency components below the predetermined frequency to the splitter device 134. The splitter device 134 splits the terrestrial wave broadcast signals Terr output from the LPF 131 into two, outputs a split one of the terrestrial wave broadcast signals to the LNA 132, and supplies the other terrestrial wave broadcast signals to the second output terminal TO12 as output terrestrial wave broadcast signals TerrO. The LNA 132 amplifies the one of the terrestrial wave broadcast signals from the splitter device 134 to the splitter device 133. The splitter device 133 splits the terrestrial wave broadcast signals Terr output from the LNA 132 into first terrestrial wave broadcast signals Terr1 and second terrestrial wave broadcast signals Terr2. The splitter device 133 supplies the split first terrestrial wave broadcast signals Terr1 to the first terrestrial wave tuner 16 serving as the third frequency converter via the third signal line SL13. The splitter device 133 supplies the split second terrestrial wave broadcast signals Terr2 to the second terrestrial wave tuner 17 serving as the fourth frequency converter via the fourth signal line SL14.

The first satellite wave tuner 14 is supplied with the first satellite wave broadcast signals Sat1 split by the first splitter unit 12, and functions as the first frequency converter to perform frequency conversion of the first satellite wave broadcast signals Sat1 into first baseband signals. The first satellite wave tuner 14 outputs the first baseband signals obtained by frequency conversion to the digital/analog demodulator 18 serving as the first demodulator as signals S14.

The second satellite wave tuner 15 is supplied with the second satellite wave broadcast signals Sat2 split by the first splitter unit 12, and functions as the second frequency converter to perform frequency conversion of the second satellite wave broadcast signals Sat2 into second baseband signals. The second satellite wave tuner 15 outputs the second baseband signals obtained by frequency conversion to the digital demodulator 19 serving as the second demodulator as signals S15.

The first terrestrial wave tuner 16 is supplied with the first terrestrial wave broadcast signals Terr1 split by the second splitter unit 13, and functions as the third frequency converter to perform frequency conversion of the first terrestrial wave broadcast signals Terr1 into first intermediate frequency signals. The first terrestrial wave tuner 16 outputs the first intermediate frequency signals to the digital/analog demodulator 18 as signals S16. The second terrestrial wave tuner 17 is supplied with the second terrestrial wave broadcast signals Terr2 split by the second splitter unit 13, and functions as the fourth frequency converter to perform frequency conversion of the second terrestrial wave broadcast signals Terr2 into second intermediate frequency signals. The second terrestrial wave tuner 17 outputs the second intermediate frequency signals to the digital demodulator 19 as signals S17.

Figure 2:
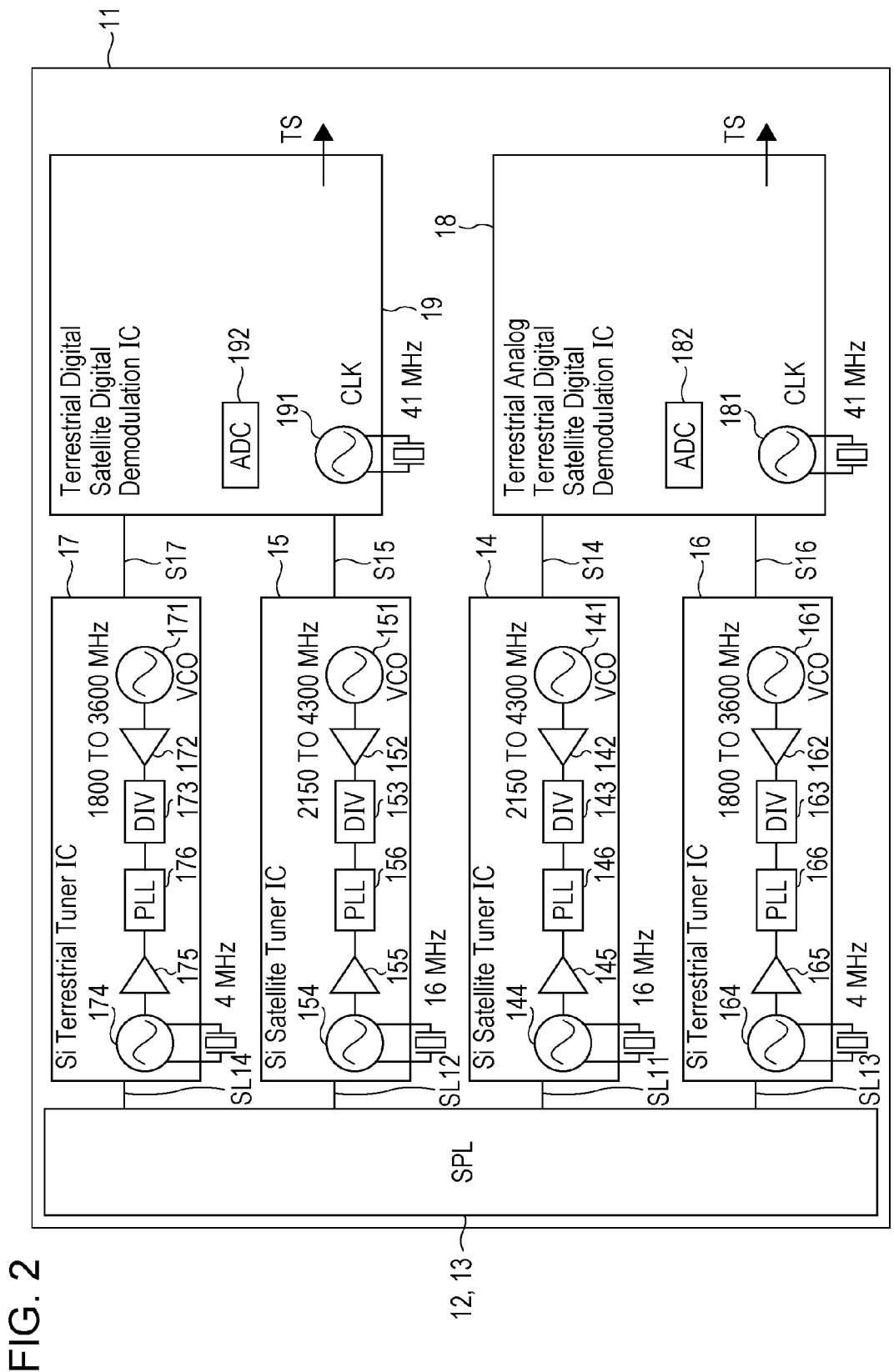
FIG. 2 is a diagram illustrating a configuration example of oscillation systems of first and second satellite wave tuners, and first and second terrestrial wave tuners.

FIG. 2 is a diagram illustrating a configuration example of oscillation systems of first and second satellite wave tuners and first and second terrestrial wave tuners. Note that in FIG. 2, only the oscillation systems are shown, and mixers which receive clock signals from the oscillation systems and perform mixing of input broadcast signals are omitted.

The first satellite wave tuner 14 has a local oscillator 141 made up of a voltage control oscillator (VCO) which emits local oscillation signals of frequencies 2150 MHz to 4300 MHz for example, a buffer 142, and a divider 143. The first satellite wave tuner 14 has a crystal oscillator 144 which emits a reference clock of a frequency of 16 MHz for example, a buffer 145, and a PLL circuit 146. The PLL circuit 146 supplies, to an unshown mixer, clock signals obtained by synchronizing the local oscillation signals divided by the divider 143 to the reference clock signals.

The second satellite wave tuner 15 has a local oscillator 151 made up of a voltage control oscillator (VCO) which emits local oscillation signals of frequencies 2150 MHz to 4300 MHz for example, a buffer 152, and a divider 153. The second satellite wave tuner 15 has a crystal oscillator 154 which emits a reference clock of a frequency of 16 MHz for example, a buffer 155, and a PLL circuit 156. The PLL circuit 156 supplies, to an unshown mixer, clock signals obtained by synchronizing the local oscillation signals divided by the divider 153 to the reference clock signals.

The first terrestrial wave tuner 16 has a local oscillator 161 made up of a voltage control oscillator (VCO) which emits local oscillation signals of frequencies 1800 MHz to 3600 MHz for example, a buffer 162, and a divider 163. The first satellite wave tuner 16 has a crystal oscillator 164 which emits a reference clock of a frequency of 4 MHz for example, a buffer 165, and a PLL circuit 166. The PLL circuit 166 supplies, to an unshown mixer, clock signals obtained by synchronizing the local oscillation signals divided by the divider 163 to the reference clock signals.

The second terrestrial wave tuner 17 has a local oscillator 171 made up of a voltage control oscillator (VCO) which emits local oscillation signals of frequencies 1800 MHz to 3600 MHz for example, a buffer 172, and a divider 173. The second satellite wave tuner 17 has a crystal oscillator 174 which emits a reference clock of a frequency of 4 MHz for example, a buffer 175, and a PLL circuit 176. The PLL circuit 176 supplies, to an unshown mixer, clock signals obtained by synchronizing the local oscillation signals divided by the divider 173 to the reference clock signals.

These first satellite wave tuner 14, second satellite wave tuner 15, first terrestrial wave tuner 16, and second terrestrial wave tuner 17 are arrayed in parallel to the split output of the first splitter unit 12 and second splitter unit 13. Also, with the present embodiment, as a countermeasure to disturbance such as noise, of the four tuners 14 through 17 the first terrestrial wave tuner 16 and second terrestrial wave tuner 17 are disposed distanced one from another at the edge portion sides (outer sides) of the module board 11. That is to say, the terrestrial wave tuners have analog broadcasting which is most readily influenced by disturbance, so each of the terrestrial wave tuners is situated at the edge portions (end portions) of the module board 11, thereby implementing countermeasures as to local oscillation disturbance. Disturbances such as noise will be described later in detail.

With the configurations in FIG. 1 and FIG. 2, the first terrestrial wave tuner 16 serving as the third frequency converter performing frequency conversion of terrestrial wave broadcast signals and the second terrestrial wave tuner 17 serving as the fourth frequency converter are situated on the outer sides of the parallel placement. Specifically, the first terrestrial wave tuner 16 is situated at the third edge portion 11c side at the generally middle portion of the module board 11, and the second terrestrial wave tuner 17 is situated at the fourth edge portion 11d. The first satellite wave tuner 14 serving as the first frequency converter and the second satellite wave tuner serving as the second frequency converter are then arrayed in parallel between the placement positions of the first terrestrial wave tuner 16 and second terrestrial wave tuner 17. In this case, the order of array is, from the third edge portion 11c side which is one outer side placement portion, the first terrestrial wave tuner 16, first satellite wave tuner 14, second satellite wave tuner 15, and second terrestrial wave tuner 17. The digital/analog demodulator 18 and digital demodulator 19 are placed in parallel as to the output of the first terrestrial wave tuner 16, first satellite wave tuner 14, second satellite wave tuner 15, and second terrestrial wave tuner 17. The first terrestrial wave tuner 16 and first satellite wave tuner 14 are then placed in parallel so that the outputs thereof face the input side of the digital/analog demodulator 18 serving as the first demodulator. The second satellite wave tuner 15 and second terrestrial wave tuner 17 are placed in parallel so that the output sides thereof face the input side of the digital demodulator 19 serving as the second demodulator.

Figure 3:
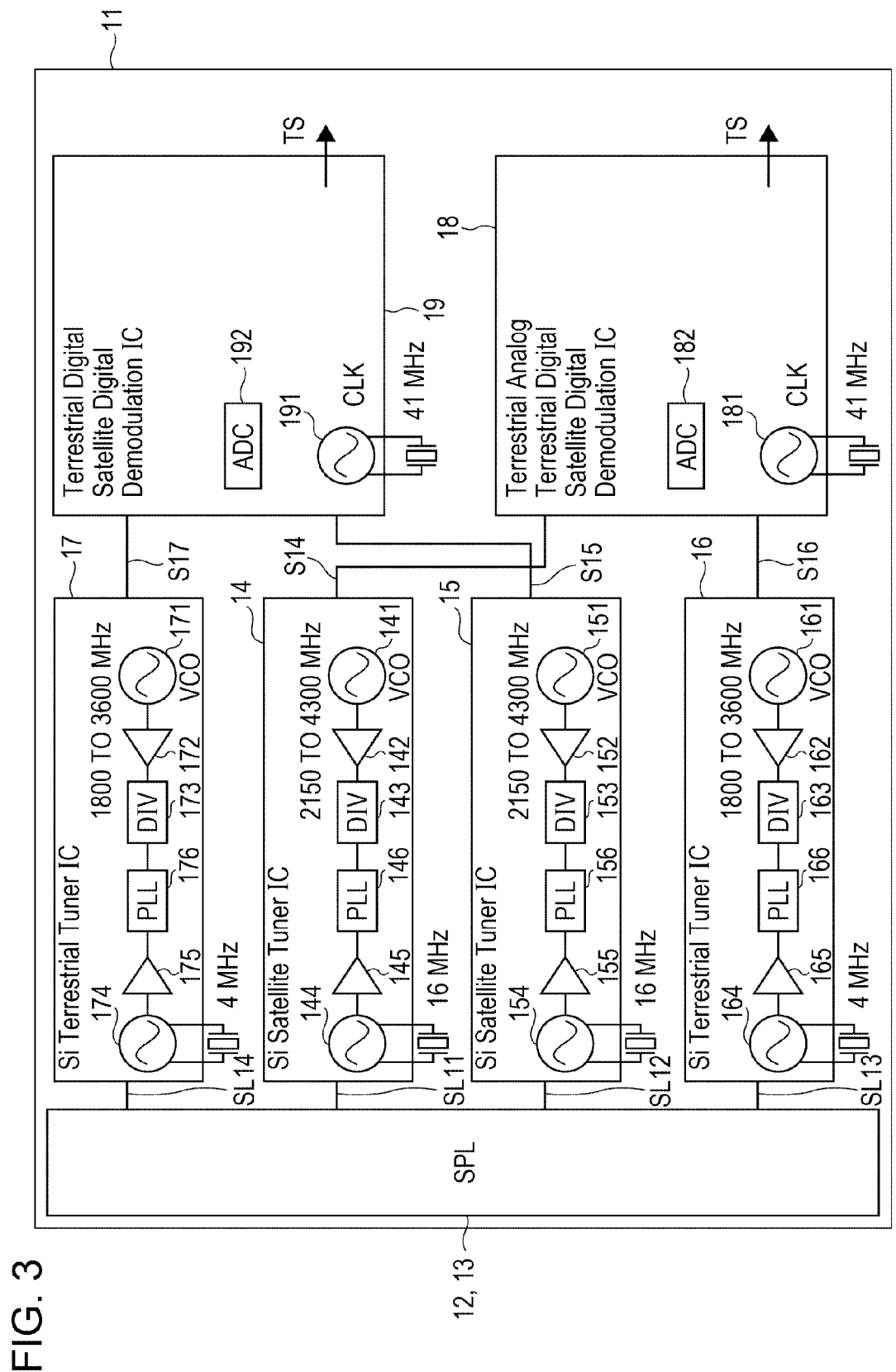
FIG. 3 is a diagram illustrating a configuration where the positions of the first and second satellite wave tuners have been switched as to the configuration in FIG. 2.

Note that as shown in FIG. 3, the placement positions of the first satellite wave tuner 14 and second satellite wave tuner 15 may be switched. In this case, the order of array is, from the third edge portion 11c side which is one outer side placement portion, the first terrestrial wave tuner 16, second satellite wave tuner 15, first satellite wave tuner 14, and second terrestrial wave tuner 17. The digital/analog demodulator 18 and digital demodulator 19 are placed in parallel as to the output of the first terrestrial wave tuner 16, second satellite wave tuner 15, first satellite wave tuner 14, and second terrestrial wave tuner 17 arrayed in parallel. The first terrestrial wave tuner 16 and second satellite wave tuner 15 are then placed in parallel so that the output sides thereof face the input side of the digital/analog demodulator 18 serving as the first demodulator. The first satellite wave tuner 14 and second terrestrial wave tuner 17 are placed in parallel so that the output sides thereof face the input side of the digital demodulator 19 serving as the second demodulator.

The digital/analog demodulator 18 functions as a first demodulator having demodulation functions of the first baseband signals from the first satellite wave tuner 14 serving as the first frequency converter and the first intermediate frequency signals from the first terrestrial wave tuner 16 serving as the third frequency converter. As shown in FIG. 2 and FIG. 3, the digital/analog demodulator 18 includes a crystal oscillator 181 for generating a master lock, and an analog/digital converter (ADC) 182.

The digital/analog demodulator 18 is configured including digital demodulation and analog demodulation functions, and has the following functions. The digital/analog demodulator 18 demodulates the video signals and audio signals of the first baseband signals from the first satellite wave tuner 14, and generates a first transport stream. In the event that the first intermediate frequency signals from the first terrestrial wave tuner 16 are signals obtained by frequency conversion of terrestrial wave digital broadcast signals, the digital/analog demodulator 18 demodulates the video signals and audio signals of the first intermediate frequency signals and generates a second transport stream. In the event that the first intermediate frequency signals are signals obtained by frequency conversion of terrestrial wave analog broadcast signals, the digital/analog demodulator 18 demodulates the video signals and audio signals of the first intermediate frequency signals, and generates analog video signals ASV and analog audio signals ASA. The digital/analog demodulator 18 supplies the generated first transport stream or second transport stream to the third output terminal TO13. The digital/analog demodulator 18 supplies the generated analog video signals to the fifth output terminal TO15, and supplies the analog audio signals to the sixth output terminal TO16.

Figure 4:
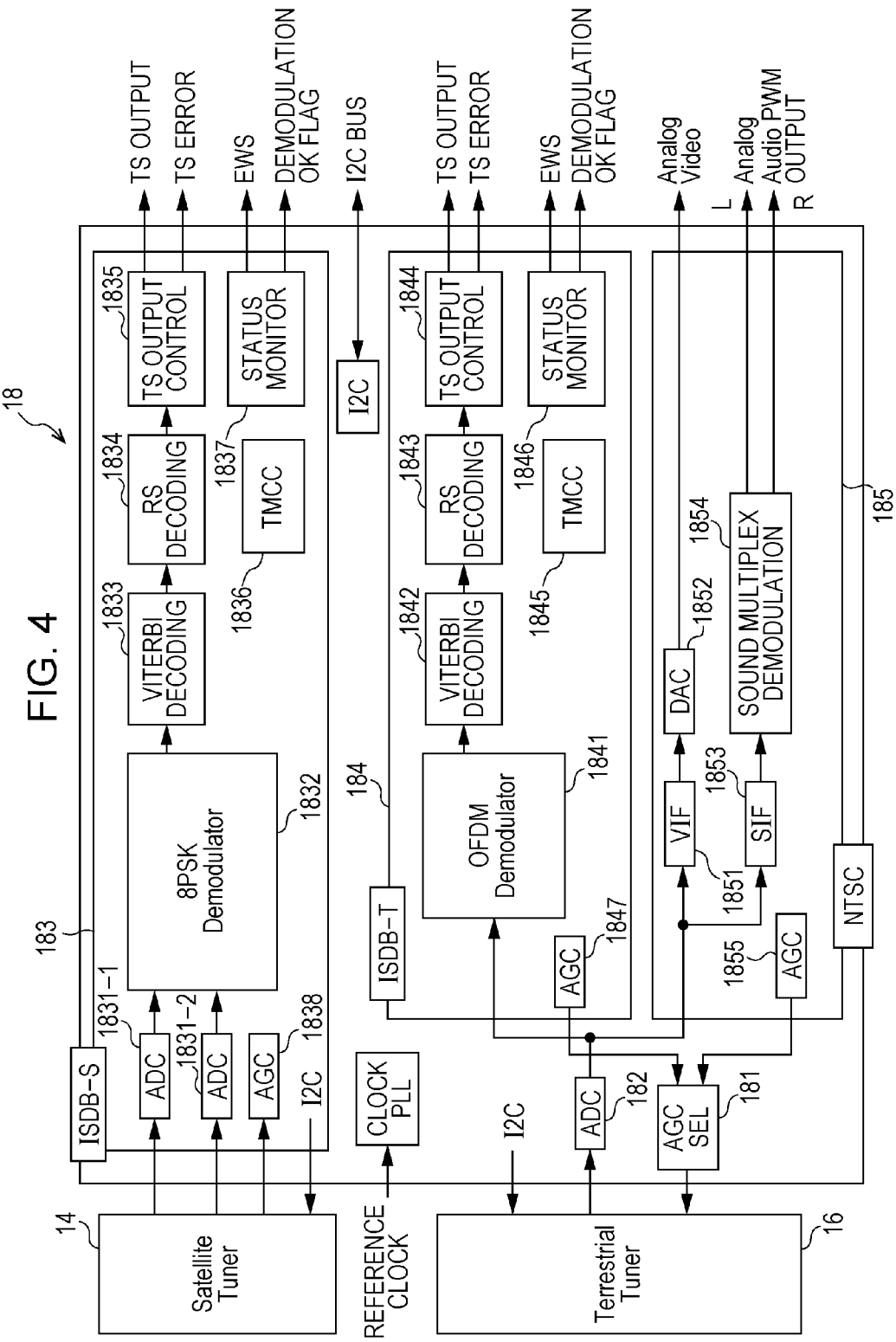
FIG. 4 is a block diagram illustrating a configuration example of a digital/analog demodulator according to the present embodiment.

FIG. 4 is a block diagram illustrating a configuration example of a digital/analog demodulator according to the present embodiment.

The digital/analog demodulator 18 has a satellite wave demodulator 183, a terrestrial wave digital demodulator 184, and a terrestrial wave analog demodulator 185. The satellite wave demodulator 183 handles the ISDB-S (Integrated Services Digital Broadcasting-Satellite) format, the terrestrial wave digital demodulator 184 handles the ISDB-T (Terrestrial) format, and the terrestrial wave analog demodulator 185 handles the NTSC format. A TS output control unit 1835 performs TS output, and also outputs to error information.

The satellite wave demodulator 183 has ADCs 1831-1 and 1831-2, an 8PSK demodulator 1832, a Viterbi decoder 1833, a Reed-Solomon (RS) decoder 1834, and the TS output control unit 1835. The satellite wave demodulator 183 has a TMCC (Transmission and Multiplexing Configuration and Control) unit 1836 capable of handling emergency warning broadcast, a status monitor 1837, and an AGC (Auto Gain Control) unit 1838. The status monitor 1837 performs output of a demodulation OK flag indicating that output and demodulation of emergency warning signals (EWS: Emergency Warning Signal) have ended successfully, and so forth.

The terrestrial wave digital demodulator 184 has an OFDM demodulator 1841, a Viterbi decoder 1842, an RS decoder 1843, a TS output control unit 1844, a TMCC unit 1845 capable of handling emergency warning broadcast, a status monitor 1846, and an AGC unit 1847. The status monitor 1846 performs output of a demodulation OK flag indicating that output and demodulation of EWS have ended successfully, and so forth.

The terrestrial wave analog demodulator 185 has a video intermediate frequency signal processing unit (VIF) 1851, a digital/analog converter (DAC) 1852, a sound intermediate frequency signal processing unit (SIF) 1853, an audio multiplexing demodulator 1854, and an AGC unit 1855. The DAC 1852 outputs analog video signals, and the audio multiplexing demodulator 1854 outputs analog audio signals.

The digital demodulator 19 functions as a second demodulator having demodulation functions of the second baseband signals from the second satellite wave tuner 15 serving as the second frequency converter and the second intermediate frequency signals from the second terrestrial wave tuner 17 serving as the fourth frequency converter. As shown in FIG. 2 and FIG. 3, the digital demodulator 19 includes a crystal oscillator 191 for generating a master lock, and an analog/digital converter (ADC) 192.

The digital demodulator 19 is configured including digital demodulation functions, and has the following functions. The digital demodulator 19 demodulates the video signals and audio signals of the second baseband signals from the second satellite wave tuner 15, and generates a third transport stream. In the event that the second intermediate frequency signals from the second terrestrial wave tuner 17 are signals obtained by frequency conversion of terrestrial wave digital broadcast signals, the digital demodulator 19 demodulates the video signals and audio signals of the second intermediate frequency signals and generates a fourth transport stream.

The digital demodulator 19 supplies the generated third transport stream or fourth transport stream to the fourth output terminal TO14.

The digital demodulator 19 has the same configuration as the satellite wave demodulator 183 and terrestrial wave digital demodulator 184 shown in FIG. 4.

The receiver having the above-described configuration is capable of receiving terrestrial wave analog television broadcast, terrestrial wave digital television broadcast, and satellite wave digital television broadcast, with a single front end module with no interference between digital circuit and analog circuit. With the receiver 10, these multiple broadcasts can be received at the same time with two channels. The receiver 10 can receive the combinations of terrestrial wave analog television broadcast and terrestrial wave digital television broadcast, terrestrial wave analog television broadcast and satellite wave digital television broadcast, and terrestrial wave digital television broadcast and terrestrial wave digital television broadcast. The receiver 10 can receive the combinations of terrestrial wave digital television broadcast and satellite wave digital television broadcast, and satellite wave digital television broadcast and satellite wave digital television broadcast.

Next, interference disturbance will be described. Countermeasures need to be taken regarding the following issues which may occur, in order to smoothly operate the front end module without interference disturbance.

(1) Harmonics of the satellite wave digital TS output from the digital demodulator 19 enter the terrestrial wave RF band, and are superimposed as disturbance signals within the intermediate frequency signal band output from the first terrestrial wave tuner 16 (disturbance 1).

(2) Harmonics of the terrestrial wave digital TS output from the digital demodulator 19 enter the terrestrial wave RF band, and are superimposed as disturbance signals within the intermediate frequency signal band output from the first terrestrial wave tuner 16 (disturbance 2).

(3) Local oscillation components of the first terrestrial wave tuner 16 enter the satellite wave RF band, and are superimposed as noise on the baseband signals output from the second satellite wave tuner 15 (disturbance 3).

(4) Local oscillation components of the second terrestrial wave tuner 17 enter the satellite wave RF band, and are superimposed as noise on the baseband signals output from the first satellite wave tuner 14 (disturbance 4).

(5) Harmonic components of crystal oscillator signals used for frequency conversion by the first and second satellite wave tuners 14 and 15 enter the terrestrial wave RF band, and are superimposed as disturbance signals within the intermediate frequency signal band output from the first and second satellite wave tuners 14 and 15 (disturbance 5).

(6) Harmonics of the master clock of the digital/analog demodulator 18 enter the terrestrial wave RF band, and are superimposed as disturbance signals within the intermediate frequency signal band output from the first terrestrial wave tuner 16 (disturbance 6).

(7) Local oscillation components of the second terrestrial wave tuner 17 enter the terrestrial wave RF band, and are superimposed as disturbance signals within the intermediate frequency signal band output from the first terrestrial wave tuner 16 (disturbance 7).

(8) Local oscillation components of the first terrestrial wave tuner 16 enter the terrestrial wave RF band, and are superimposed as disturbance signals within the intermediate frequency signal band output from the second terrestrial wave tuner 17 (disturbance 8).

(9) Local oscillation components of the first satellite wave tuner 14 enter the satellite wave RF band, and are superimposed as noise on the baseband signals output from the second satellite wave tuner 15 (disturbance 9).

(10) Local oscillation components of the second satellite wave tuner 15 enter the satellite wave RF band, and are superimposed as noise on the baseband signals output from the first satellite wave tuner 14 (disturbance 10).

Figure 5:
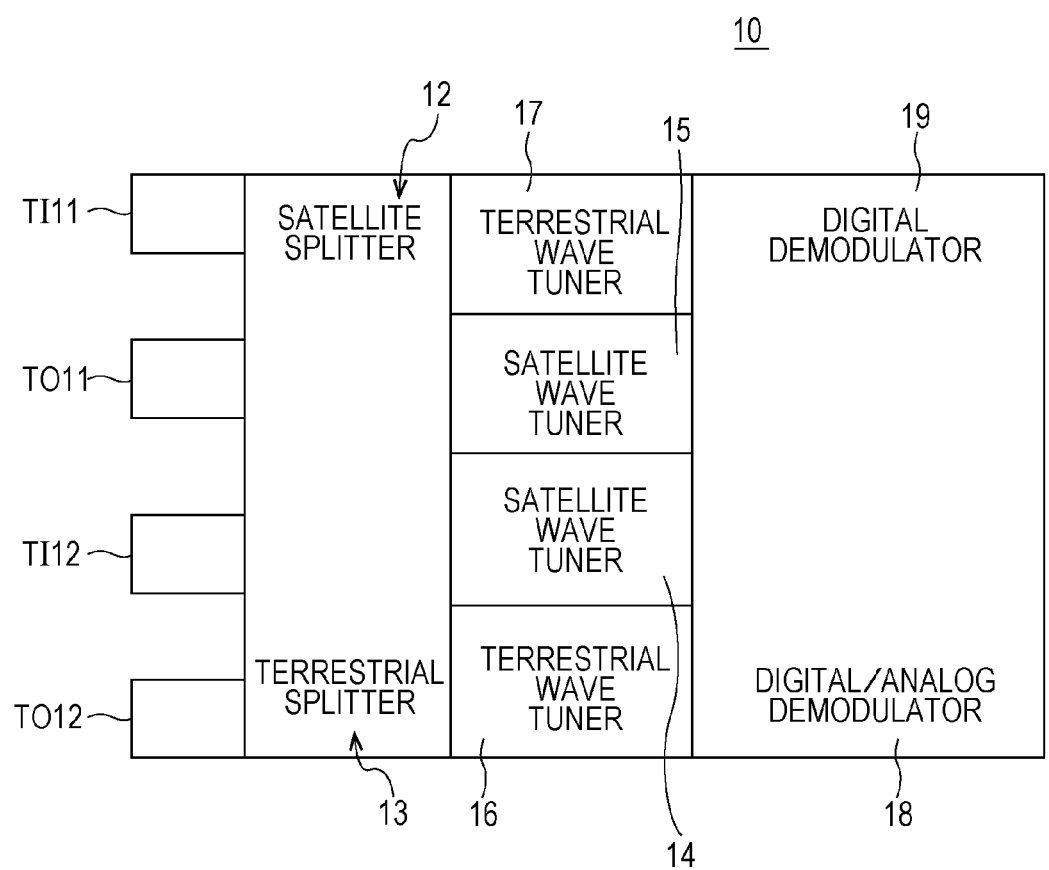
FIG. 5 is a diagram schematically illustrating an example of disturbance prevention according to the present embodiment.

Accordingly, with the present embodiment, the following countermeasures are taken against the above disturbance. FIG. 5 is a diagram schematically illustrating an example of disturbance countermeasures according to the present embodiment. As shown in FIG. 5, with the present embodiment, partitions are formed at each of the splitter units (splitter units), terrestrial wave tuner units, satellite wave tuner units, and demodulator units, so as to seclude each. Further, with the present embodiment, terrestrial wave tuners have analog broadcasting which is most readily influenced by disturbance, so each of the terrestrial wave tuners is situated at the edge portions (end portions) of the module board 11, thereby implementing countermeasures as to local oscillation disturbance. Also, the junction portion between the ground GND and shield case is situated at a position taking into consideration the return current. Also, the GND pattern is designed taking into consideration the return current, thereby suppressing the above-described radiation disturbance, and serving as a splitter unit (splitter) with a single front end module. Further, the combinations of terrestrial wave analog television broadcast and terrestrial wave digital television broadcast, terrestrial wave analog television broadcast and satellite wave digital television broadcast, and terrestrial wave digital television broadcast and terrestrial wave digital television broadcast can be received. Further, the combinations of terrestrial wave digital television broadcast and satellite wave digital television broadcast, and satellite wave digital television broadcast and satellite wave digital television broadcast can be received.

Next, operations will be described. The satellite wave digital broadcast signals Sat are input to the first input terminal TI11 for satellite signal input, and supplied to the first splitter unit 12. At the first splitter unit 12, the unnecessary components are removed at the HPF 121, amplification is performed at the LNA 122, and split into the first satellite wave broadcast signals Sat1, second satellite wave broadcast signals Sat2, and output satellite wave digital broadcast signals SatO at the splitter device 123. The split first satellite wave broadcast signals Sat1 are supplied to the first satellite wave tuner 14 serving as the first frequency converter via the first signal line SL11. The split second satellite wave broadcast signals Sat2 are supplied to the second satellite wave tuner 15 serving as the second frequency converter via the second signal line SL12. The split output satellite wave digital broadcast signals SatO are supplied to the first output terminal TO11. The first satellite wave tuner 14 performs frequency conversion of the first satellite wave broadcast signals Sat1 into first baseband signals, and the second satellite wave tuner 15 performs frequency conversion of the second satellite wave broadcast signals Sat2 into second baseband signals. Baseband video signals and audio signals are input to the digital/analog demodulator 18 and digital demodulator 19. At the digital/analog demodulator 18 and digital demodulator 19, the input video signals and audio signals are demodulated, and output from the third output terminal TO13 and fourth output terminal TO14 as demodulated signals of a MPEG-2 format satellite wave digital TS, for example.

On the other hand, the terrestrial wave broadcast signals Terr are input to the second input terminal TI12 for terrestrial signal input, and supplied to the second splitter unit 13. At the second splitter unit 13, the unnecessary components are removed at the LPF 131, and at the splitter device 134 the terrestrial wave broadcast signals Terr output from the LPF 131 are split into two. One of the split terrestrial wave broadcast signals is output to the LNA 132, and the other of the split terrestrial wave broadcast signals is supplied to the second output terminal TO12 as output terrestrial wave broadcast signals TerrO. At the LNA 132, the one of the split terrestrial wave broadcast signals is amplified and output to the splitter device 133. At the splitter device 133, the terrestrial wave broadcast signals Terr output from the LNA 132 are split into the first terrestrial wave broadcast signals Terr1 and second terrestrial wave broadcast signals Terr2. The split first terrestrial wave broadcast signals Terr1 are supplied to the first terrestrial wave tuner 16 serving as the third frequency converter via the third signal line SL13.

The split second terrestrial wave broadcast signals Terr2 are supplied to the second terrestrial wave tuner 17 serving as the fourth frequency converter via the fourth signal line SL14. At the first terrestrial wave tuner 16, the first terrestrial wave broadcast signals Terr1 are frequency-converted into first intermediate frequency signals, and at the second terrestrial wave tuner 17, the second terrestrial wave broadcast signals Terr2 are frequency-converted into second intermediate frequency signals. The first intermediate frequency signals are input to the digital/analog demodulator 18, and the second intermediate frequency signals are input to the digital demodulator 19. The terrestrial analog signals are demodulated into analog video signals and audio signals at the digital/analog demodulator 18, and output to the fifth output terminal TO15 for video and the sixth output terminal TO16 for audio, respectively. Also, the terrestrial wave digital signals are demodulated at the digital/analog demodulator 18 and digital demodulator 19, made into a MPEG-2 format terrestrial wave digital TS the same as with BSCS digital signals, and output from the third output terminal TI13 and fourth output terminal TO14.

According to the present first embodiment, a configuration is had which receives terrestrial wave analog television broadcast, terrestrial wave digital television broadcast, and satellite wave digital television broadcast, with a single front end module. With the present first embodiment, as for a configuration to enable reception of these multiple broadcasts at the same time with two channels, a distinctive configuration is employed including secluded placement of signal splitter unit, frequency converter, and demodulator, distanced placement of terrestrial wave frequency converters, and so forth. The present first embodiment also has shared filtering of terrestrial wave digital television broadcast and satellite wave digital television broadcast demodulated signal TS clock output, and shared GND of the digital circuit portion and analog circuit portion. Also, GND pattern design measures are implemented with the receiver 10, taking into consideration the return current flowing through the GND portion. As a result thereof, all broadcasts can be received without radiation disturbance.

Also, using this front end module enables viewing and recording at the same time of combinations of terrestrial wave analog television broadcast and terrestrial wave digital television broadcast, and terrestrial wave analog television broadcast and satellite wave digital television broadcast. Enabled is viewing and recording at the same time of combinations of terrestrial wave digital television broadcast and terrestrial wave television broadcast, terrestrial wave digital television broadcast and satellite wave digital television broadcast, and satellite wave digital television broadcast and satellite wave digital television broadcast. Further, the terrestrial wave broadcast signals Terr and satellite wave digital broadcast signals Sat can be output to separate modules. Also, using this receiver (front end module) realizes reduction in space for the television receiver, and further facilitates system design. Accordingly, the installation area can be reduced as compared with common methods, and moreover usage can be made in a shielded state with the problems of interference due to the problems of placement at the time of use already solved, so design study, including interference and so forth at the board side to be installed, can be facilitated.

2. Second Embodiment

Figure 6:
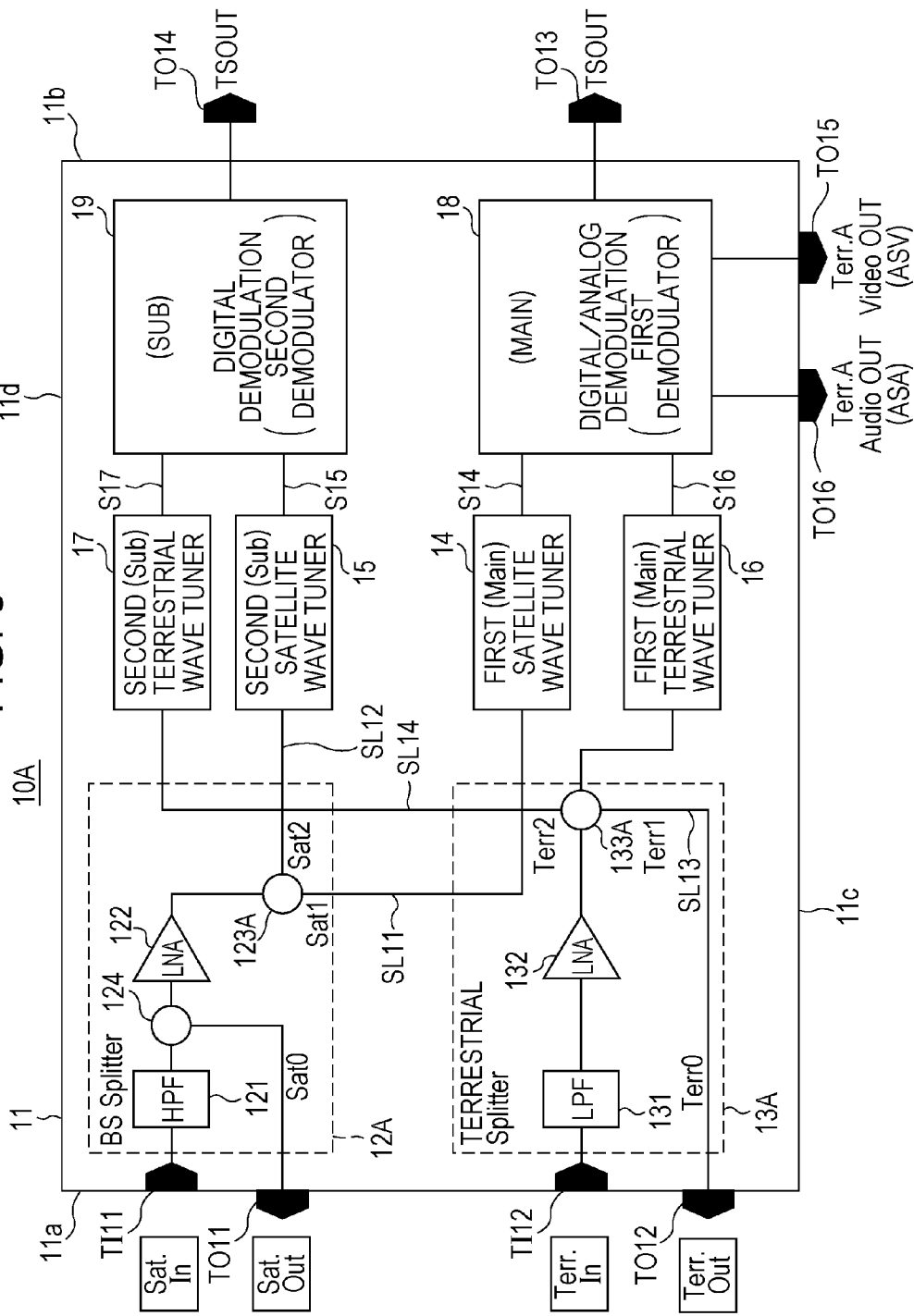
FIG. 6 is a diagram illustrating a configuration example of a broadcast signal receiver according to a second embodiment of the present invention.

FIG. 6 is a diagram illustrating a configuration example of a broadcast signal receiver according to a second embodiment of the present invention.

The receiver 10A according to the present second embodiment differs from the receiver 10 according to the first embodiment described above is in the point of the configuration of the first splitter unit 12A and second splitter unit 13A. With the receiver 10A, a splitter (first splitter) 124 is provided to the output stage of the HPF 121 at the first splitter unit 12A, and the splitter device 134 of the second splitter unit 13A is omitted.

With the first splitter unit 12A, the splitter device 124 serving as the first splitter device splits the output signals from the HPF 121 into two satellite wave digital broadcast signals, and supplies the split other output satellite wave digital broadcast signals SatO to the first output terminal TO11. A splitter device 123A serving as the second splitter device splits the output signals of the LNA 122 into the first satellite wave broadcast signals Sat1 and second satellite wave broadcast signals Sat2. The splitter device 123A supplies the split first satellite wave broadcast signals Sat1 to the first satellite wave tuner 14 serving as the first frequency converter via the first signal line SL11. The splitter device 123A supplies the split second satellite wave broadcast signals Sat2 to the second satellite wave tuner 15 serving as the second frequency converter via the second signal line SL12.

At the second splitter unit 13A, the splitter device 133A splits the output signals of the LNA 132 into the first terrestrial wave broadcast signals Terr1, second terrestrial wave broadcast signals Terr2, and output terrestrial wave broadcast signals TerrO. The splitter device 133A supplies the split first terrestrial wave broadcast signals Terr1 to the first terrestrial wave tuner 16 serving as the third frequency converter via the third signal line SL13. The splitter device 133A supplies the split second terrestrial wave broadcast signals Terr2 to the second terrestrial wave tuner 17 serving as the fourth frequency converter. The splitter device 133A supplies the split output terrestrial wave broadcast signals TerrO to the second output terminal TO12.

Other configurations are the same as with the first embodiment. According to the second embodiment, advantages the same as the advantages of the above-described first embodiment can be obtained. Note that unrestricted to the configurations of the first and second embodiments, the first splitter units 12 and 12A, and second splitter units 13 and 13A can be combined and used as suitable.

3. Third Embodiment

Figure 7:
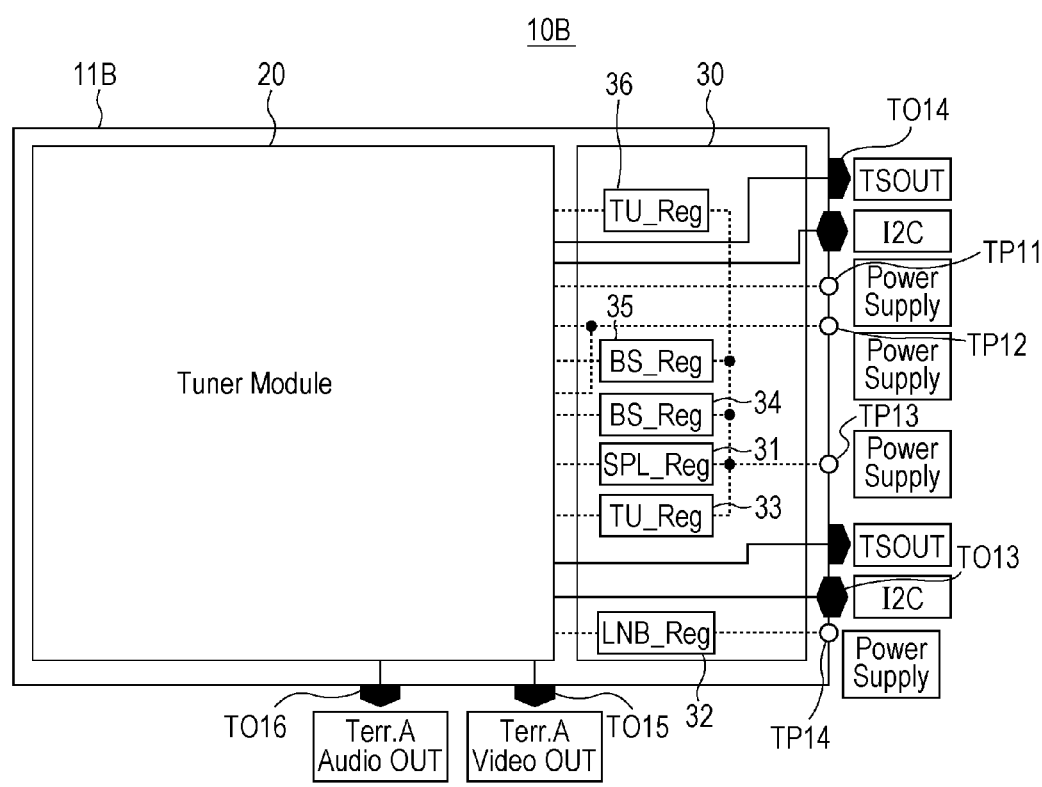
FIG. 7 is a first diagram illustrating a configuration example of a broadcast signal receiver according to a third embodiment of the present invention.
Figure 8:
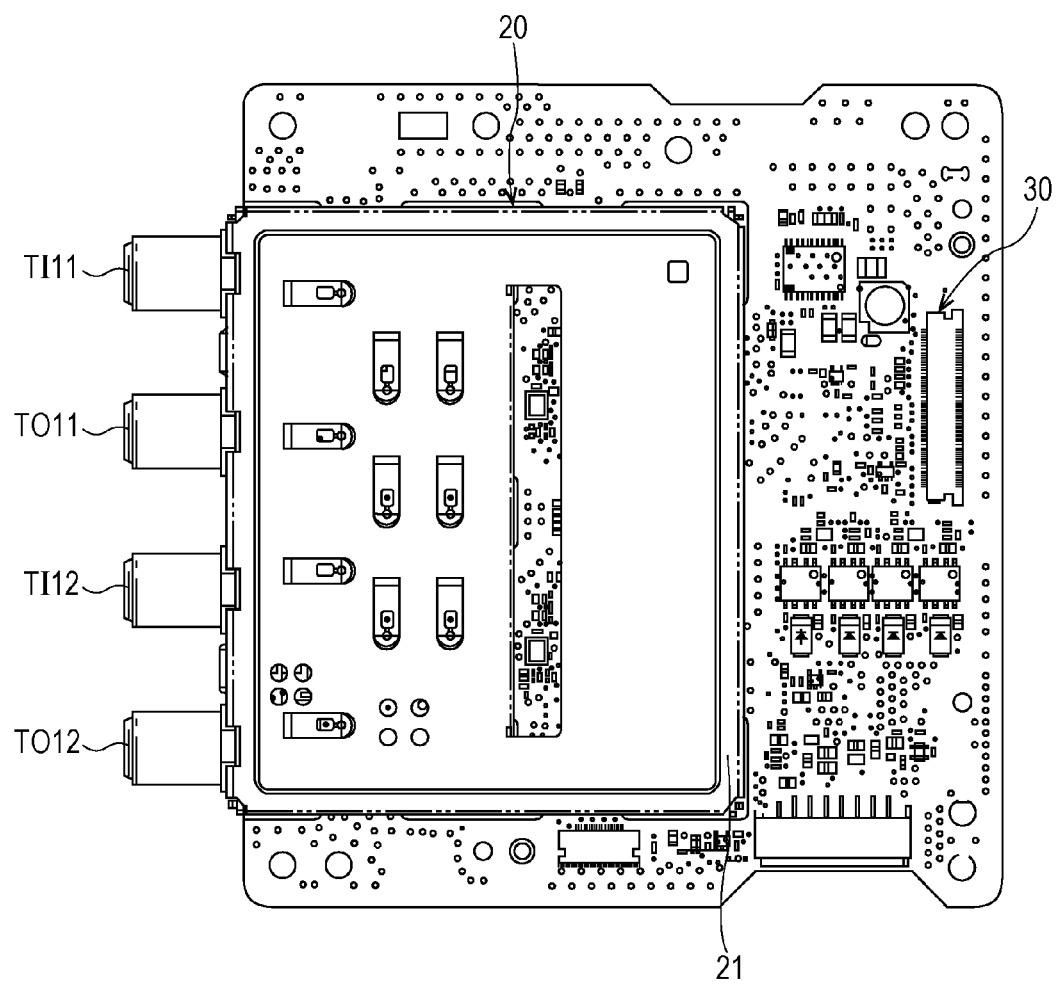
FIG. 8 is a second diagram illustrating a configuration example of a broadcast signal receiver according to the third embodiment of the present invention.

FIG. 7 and FIG. 8 are diagrams illustrating a configuration example of a broadcast signal receiver according to a third embodiment of the present invention.

As shown in FIG. 7 and FIG. 8, with a receiver 10B according to the present third embodiment, power source wiring is performed where the ground GND of a tuner module unit 20 and power supply unit 30 is shared, the tuner module unit 20 and power supply unit are disposed in a secluded manner, and further, spurious emissions are taken into consideration. This configuration enables, at the same time, the object of receiving terrestrial wave analog television broadcast, terrestrial wave digital television broadcast, and satellite wave digital television broadcast, with a single module board 11B, and the object of supplying stable power to the tuner module receiving these.

Note that the tuner module unit 20 is formed as a module including the receiver 10 of the first embodiment or the receiver 10A of the second embodiment.

The power supply unit 30 has power regulators 31 through 36 which can selectively supply driving power. The power regulator 31 selectively supplies driving power to the LNA 122 of the first splitter unit 12, for example. The power regulator 32 selectively supplies driving power to the LNA 132 of the second splitter unit 13, for example. The power regulator 33 supplies driving power to the first terrestrial wave tuner 16. The power regulator 34 supplies driving power to the first satellite wave tuner 14. The power regulator 35 supplies driving power to the second satellite wave tuner 15. The power regulator 36 selectively supplies driving power to the second terrestrial wave tuner 17.

In order for the tuner module unit 20 to operate in a stable manner, at the power supply unit 30, power is applied to the power regulators 31 through 36 from an external power source, and after voltage conversion for the specifications of each of the modules, stable power is supplied to the tuner module unit 20. To this end, power source terminals TP11 through TP14 are formed to the module board 11B.

Figure 9:
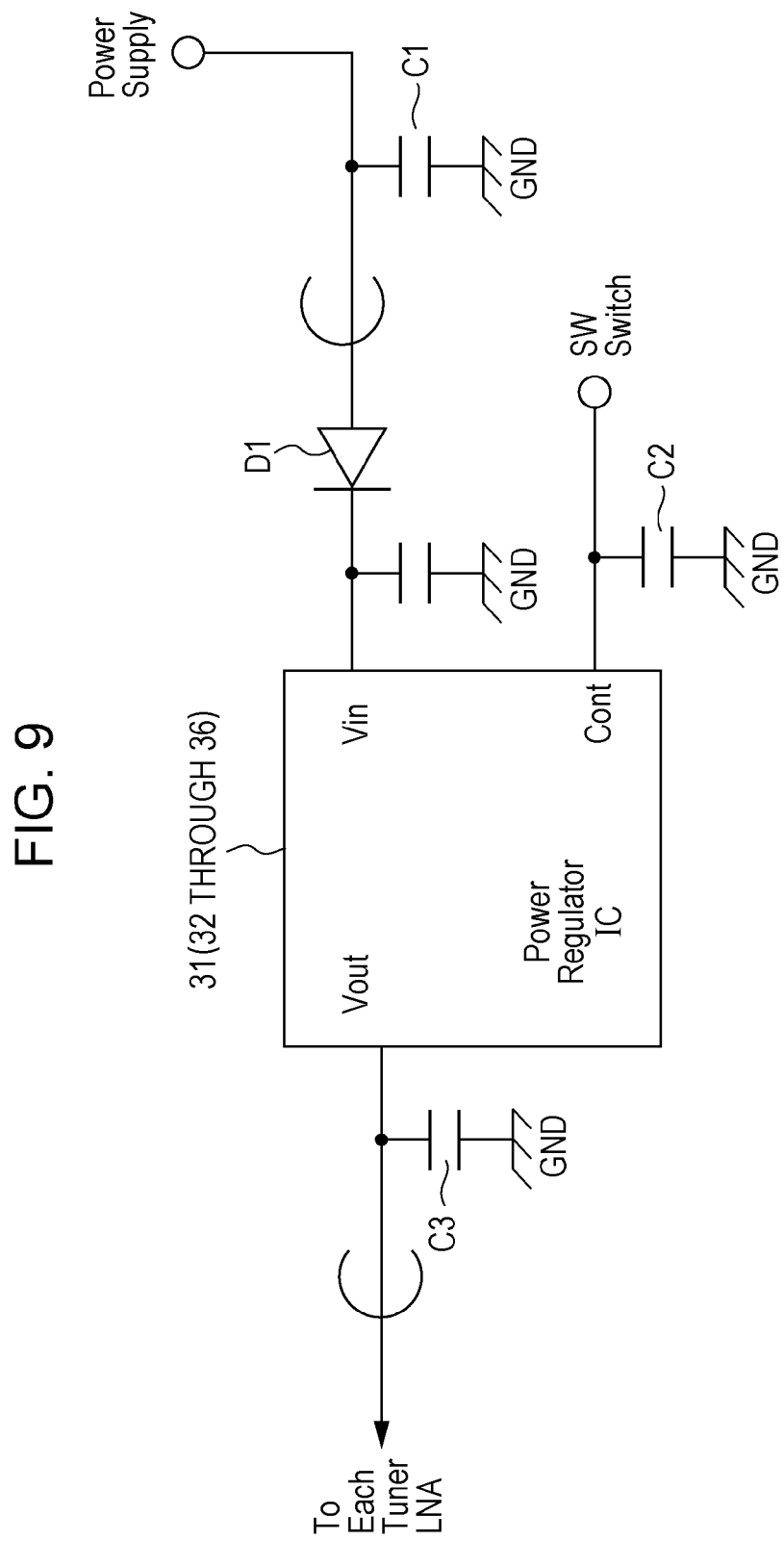
FIG. 9 is a diagram illustrating a configuration example of a power regulator.

FIG. 9 is a diagram illustrating a configuration example of the power regulator 31 (32 through 36).

Voltage is externally supplied to the power regulator 31 from a terminal Vin, and switch signals SW are supplied to a terminal Cont. The power regulator 31 is turned on and off by the switch signals SW, and accordingly driving power can be selectively supplied to the object of supply.

Now, the following point may become problematic in smoothly operating the above-described power source integrated receiver (front end module) without interference disturbance. That is to say, there is the problem that, with regard to spurious emissions (spurious) generated from the tuner module side, these may enter the tuner again via the power supply unit and become disturbance signals, and the problem that spurious emissions form the power supply unit may enter the tuner and become problematic.

Accordingly, with the third embodiment, the following countermeasures have been taken as to the above-described disturbance. As shown in FIG. 8, a shield 21 is formed to the tuner module unit 20 so as to seclude from the power supply unit 30.

Also, power line wiring is performed taking spurious emissions into consideration, and also the junction portion between the ground GND and shield case of the board is situated at a position taking into consideration the return current. Also, the GND pattern is also designed taking the return current into consideration. Accordingly, reception of terrestrial wave analog television broadcast, terrestrial wave digital television broadcast, and satellite wave digital television broadcast is enabled while suppressing the above-described radiation disturbance and supplying stable power to the tuner module.

Figure 10:
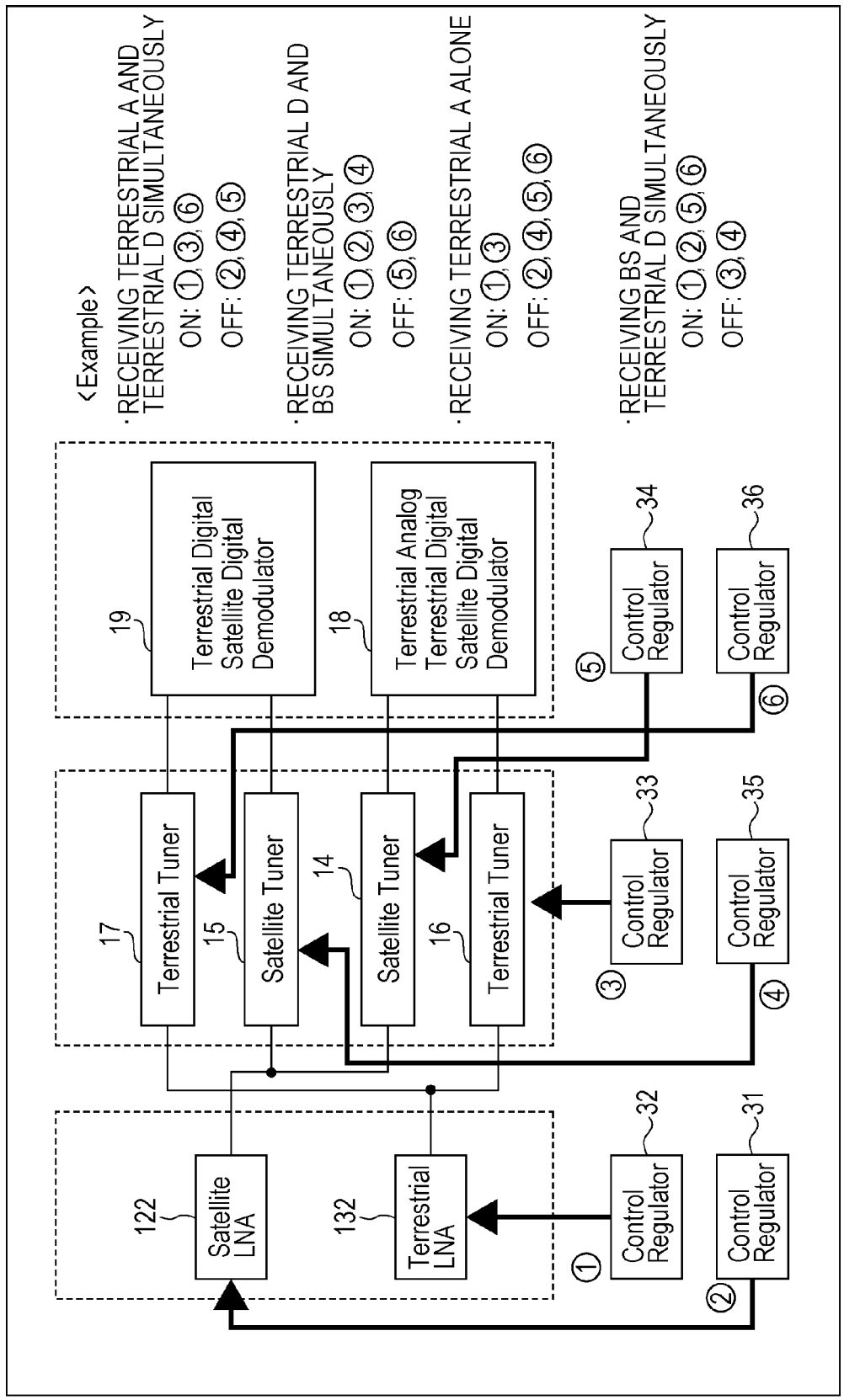
FIG. 10 is a diagram for describing an example of power supply control in a case of receiving multiple broadcasts with two or one channels at the same time with the present third embodiment.

Now, description will be made regarding an example of power supply control in a case of receiving multiple broadcasts with two or one channel. FIG. 10 is a diagram for describing an example of power supply control in the case of receiving multiple broadcasts with two or one channel according to the third embodiment.

[Simultaneous Reception of Terrestrial Wave Analog and Terrestrial Wave Digital Broadcast Signals]

At the time of simultaneous reception of terrestrial wave analog and terrestrial wave digital broadcast signals, driving power is supplied to the LNA 132 of the second splitter unit 13 by the power regulator 32. Driving power is supplied to the first terrestrial wave tuner 16 by the power regulator 33. Driving power is supplied to the second terrestrial wave tuner 17 by the power regulator 36. Supply of driving power to the LNA 122 of the first splitter unit 12 by the power regulator 31 is stopped. Supply of driving power to the first satellite wave tuner 14 by the power regulator 34 is stopped. Supply of driving power to the second satellite wave tuner 15 from the power regulator 35 is stopped.

[Simultaneous Reception of Terrestrial Wave Digital and Satellite Wave Digital Broadcast Signals]

At the time of simultaneous reception of terrestrial wave digital and satellite wave digital broadcast signals, driving power is supplied to the LNA 122 of the first splitter unit 12 by the power regulator 31. Driving power is supplied to the LNA 132 of the second splitter unit 13 by the power regulator 32. Driving power is supplied to the first terrestrial wave tuner 16 by the power regulator 33. Supply of driving power to the second satellite wave tuner 15 by the power regulator 35 is stopped. Supply of driving power to the first satellite wave tuner 14 by the power regulator 34 is stopped. Supply of driving power to the second terrestrial wave tuner 17 by the power regulator 36 is stopped.

[Reception of Terrestrial Wave Analog Signals Broadcast Signals Alone]

At the time of reception of terrestrial wave analog broadcast signals alone, driving power is supplied to the LNA 122 of the first splitter unit 12 by the power regulator 31. Driving power is supplied to the first terrestrial wave tuner 16 by the power regulator 33. Supply of driving power to the LNA 132 of the second splitter unit 13 by the power regulator 32 is stopped. Supply of driving power to the second satellite wave tuner 15 by the power regulator 35 is stopped. Supply of driving power to the first satellite wave tuner 14 by the power regulator 34 is stopped. Supply of driving power to the second terrestrial wave tuner 17 by the power regulator 36 is stopped.

[Simultaneous Reception of Satellite Wave Digital and Terrestrial Wave Digital Broadcast Signals]

At the time of simultaneous reception of satellite wave digital and terrestrial wave digital broadcast signals, driving power is supplied to the LNA 122 of the first splitter unit 12 by the power regulator 31. Driving power is supplied to the LNA 132 of the second splitter unit 13 by the power regulator 32. Driving power is supplied to the first satellite wave tuner 14 by the power regulator 34. Driving power is supplied to the second terrestrial wave tuner 17 by the power regulator 36. Driving power is supplied to the first terrestrial wave tuner 16 by the power regulator 33. Supply of driving power to the second satellite wave tuner 15 by the power regulator 35 is stopped.

The above description relates to an example where power regulators are provided to the tuners in a one-to-one manner, but one power regulator may be provided as to multiple tuners. In this case, reduced power consumption can be realized by setting, of the multiple tuners to which power is supplied, the tuners unprocessed (unused) in accordance with received broadcast signals, in a sleep state (lower power consumption mode).

Figure 11:
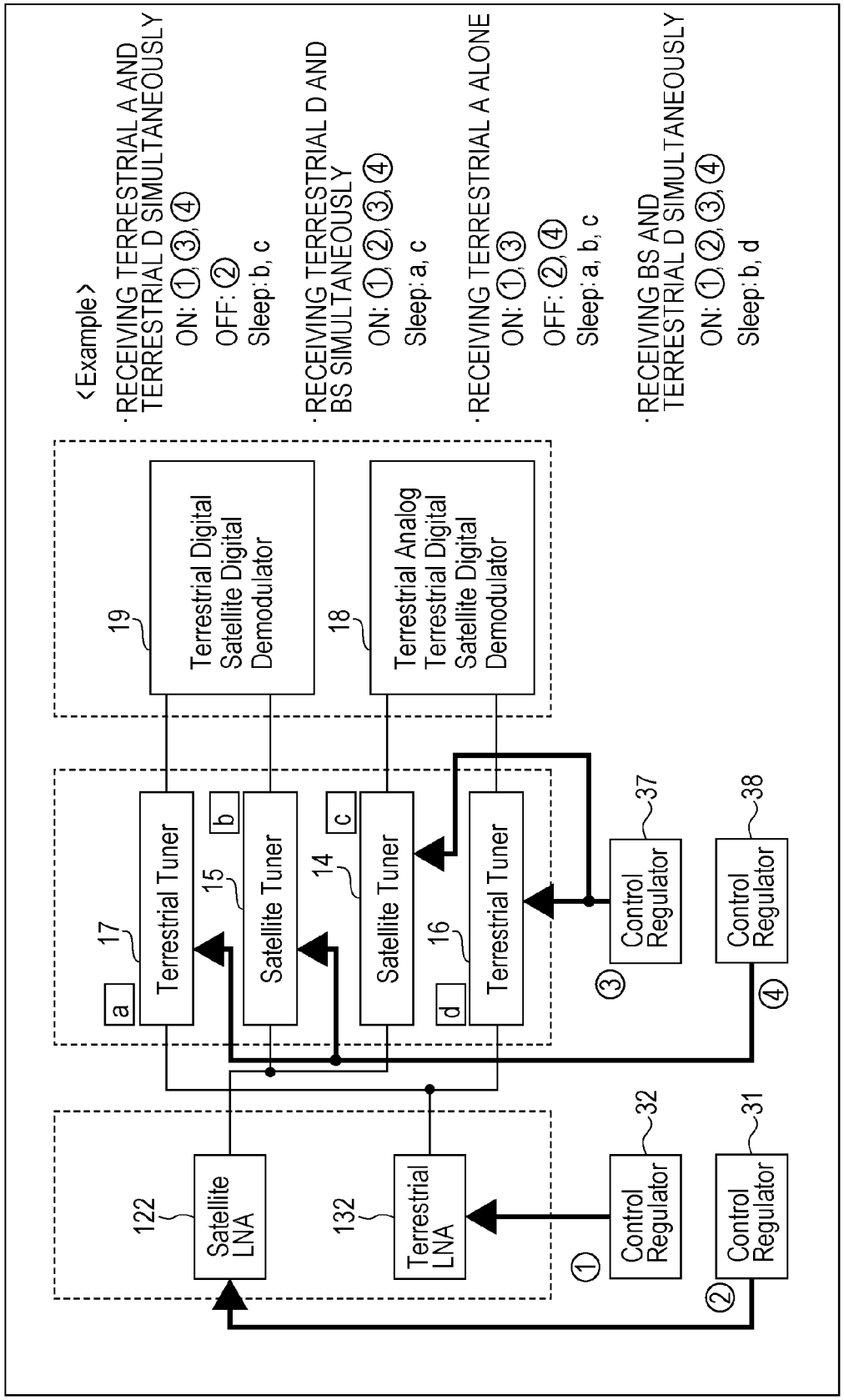
FIG. 11 is a diagram for describing another example of power supply control in a case of receiving multiple broadcasts with two or one channels at the same time with the present third embodiment.

FIG. 11 is a diagram for describing another example of power supply control in the case of receiving multiple broadcasts with two or one channel according to the third embodiment.

In this example, a power regulator 37 selectively supplies driving power to the first terrestrial wave tuner 16 and first satellite wave tuner 14, and a power regulator 38 selectively supplies driving power to the second terrestrial tuner 17 and second satellite tuner 15.

[Simultaneous Reception of Terrestrial Wave Analog and Terrestrial Wave Digital Broadcast Signals]

At the time of simultaneous reception of terrestrial wave analog and terrestrial wave digital broadcast signals, driving power is supplied to the LNA 132 of the second splitter unit 13 by the power regulator 32. Driving power is supplied to the first terrestrial wave tuner 16 and the first satellite wave tuner 14 by the power regulator 37. Driving power is supplied to the second terrestrial wave tuner 17 and the second satellite wave tuner 15 by the power regulator 38. Supply of driving power to the LNA 122 of the first splitter unit 12 by the power regulator 31 is stopped. Also, the first satellite wave tuner 14 and second satellite wave tuner 15 are controlled to sleep mode.

[Simultaneous Reception of Terrestrial Wave Digital and Satellite Wave Digital Broadcast Signals]

At the time of simultaneous reception of terrestrial wave digital and satellite wave digital broadcast signals, driving power is supplied to the LNA 122 of the first splitter unit 12 by the power regulator 31. Driving power is supplied to the LNA 132 of the second splitter unit 13 by the power regulator 32. Driving power is supplied to the first terrestrial wave tuner 16 and first satellite wave tuner 14 by the power regulator 37. Driving power is supplied to the second terrestrial wave tuner 17 and second satellite wave tuner 15 by the power regulator 38. Also, the second terrestrial wave tuner 17 and first satellite wave tuner 14 are controlled to sleep mode.

[Reception of Terrestrial Wave Analog Signals Broadcast Signals Alone]

At the time of reception of terrestrial wave analog broadcast signals alone, driving power is supplied to the LNA 122 of the first splitter unit 12 by the power regulator 31. Driving power is supplied to the first terrestrial wave tuner 16 and first satellite wave tuner 14 by the power regulator 37. Supply of driving power to the LNA 132 of the second splitter unit 13 by the power regulator 32 is stopped. Supply of driving power to the second terrestrial wave tuner 17 and second satellite wave tuner 15 by the power regulator 38 is stopped. Also, the first satellite wave tuner 14, second satellite wave tuner 15, and second terrestrial wave tuner 17 are controlled to sleep mode.

[Simultaneous Reception of Satellite Wave Digital and Terrestrial Wave Digital Broadcast Signals]

At the time of simultaneous reception of satellite wave digital and terrestrial wave digital broadcast signals, driving power is supplied to the LNA 122 of the first splitter unit 12 by the power regulator 31. Driving power is supplied to the LNA 132 of the second splitter unit 13 by the power regulator 32.

Driving power is supplied to the first terrestrial wave tuner 16 and first satellite wave tuner 14 by the power regulator 37. Driving power is supplied to the second terrestrial wave tuner 17 and second satellite wave tuner 15 by the power regulator 38. Also, the first satellite wave tuner 14 and second satellite wave tuner 15 are controlled to sleep mode.

According to the third embodiment, reception of terrestrial wave analog television broadcast, terrestrial wave digital television broadcast, and satellite wave digital television broadcast is enabled while supplying power in a stable manner with a single module. Also, according to the third embodiment, the ground GND of the tuner module unit 20 and power supply unit 30 is shared, and the tuner module unit 20 and power supply unit 30 are placed in a secluded manner. The junction portion between the shield case and GND pattern, and GND pattern are designed taking into consideration the return current from the ground GND, thereby suppressing radiation disturbance, and enabling reception of all broadcasts in a stable manner. Also, by using this power source integrated front end module, the two boards which had been used with common television receivers for the tuner unit and power source unit can be simplified to one board. Accordingly, reduction in space and reduction in the number of component parts can be realized, further facilitating system design. Accordingly, the installation area can be reduced as compared with common methods, and moreover usage can be made in a state with the problems of interference due to the problems of placement at the time of use already solved, so design study at the usage side can be facilitated.

4. Fourth Embodiment

Figure 12:
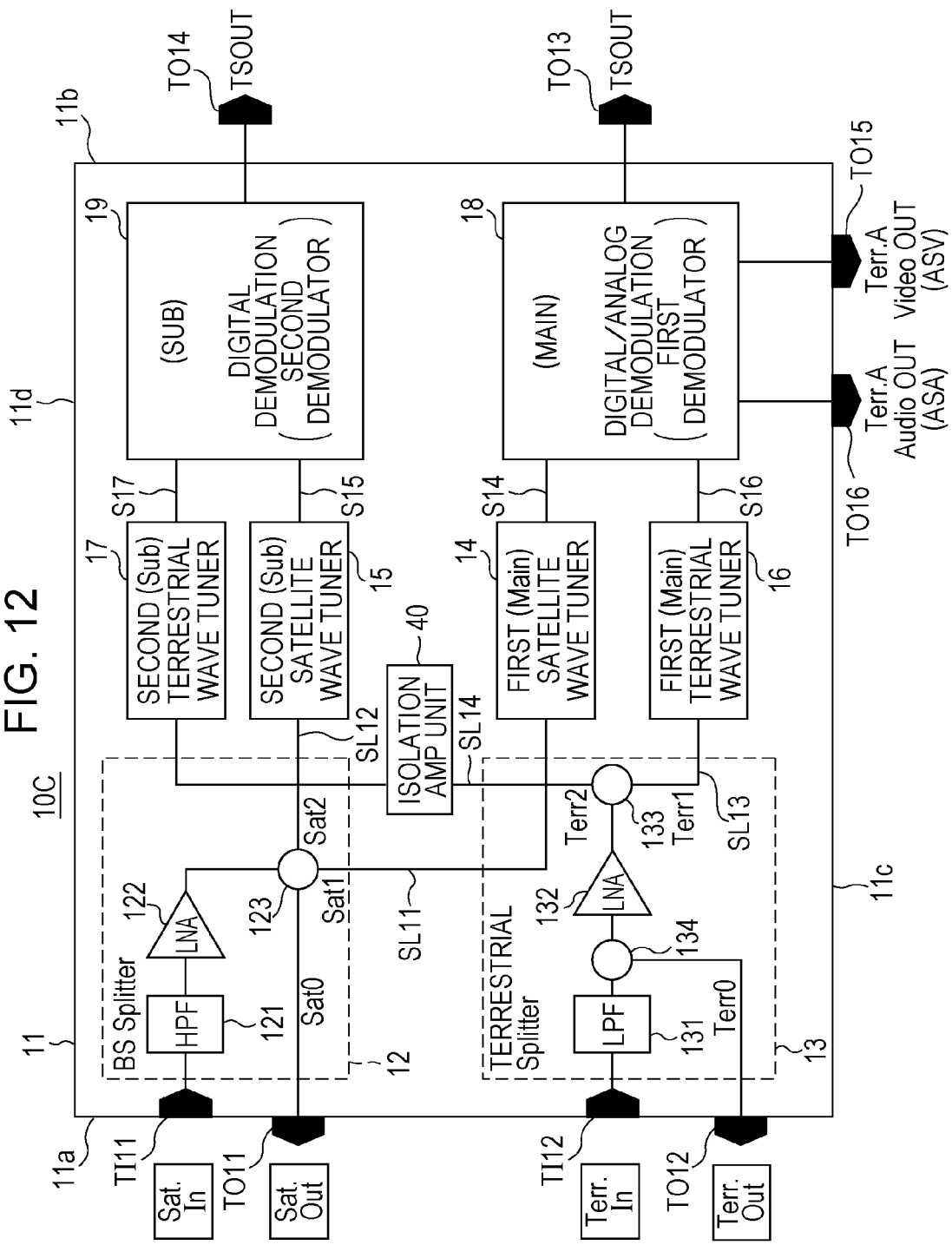
FIG. 12 is a diagram illustrating a configuration example of a broadcast signal receiver according to a fourth embodiment of the present invention.

FIG. 12 is a diagram illustrating a configuration example of a broadcast signal receiver according to a fourth embodiment of the present invention.

The receiver 10C according to the fourth embodiment has an isolation amp unit 40 disposed on the fourth signal line SL14.

The isolation amp unit 40 includes a buffer amp formed of transistors where terrestrial wave broadcast signals split at the second splitter unit 13 are input to the control terminal and low-impedance output is performed by impedance transform. An attenuator is disposed to at least one of the input side or output side of the buffer amp. Note that an attenuator attenuates input signals, and outputs attenuated signals.

Figure 13:
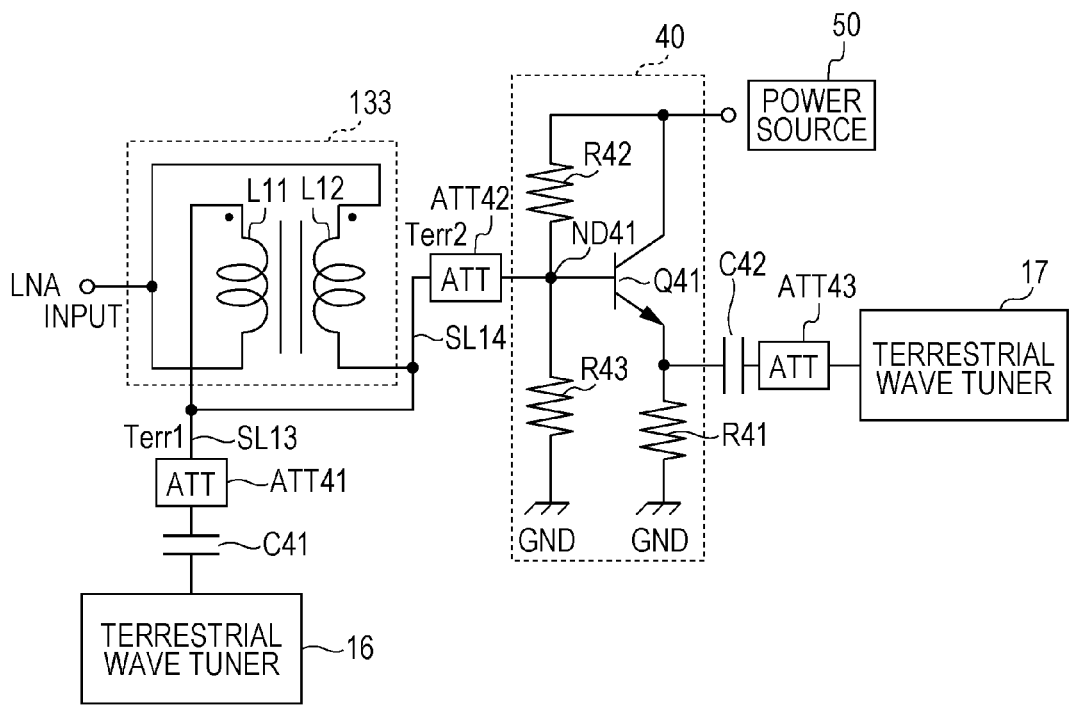
FIG. 13 is a diagram illustrating a first configuration example of a splitter device and isolation amplifier unit according to the present fourth embodiment.

FIG. 13 is a diagram illustrating a first configuration example of the splitter device and isolation amp unit according to the fourth embodiment.

The splitter device 133 in FIG. 13 is configured of a distribution transformer T133. The distribution transformer T133 includes an inductor L11 and inductor L12. The other end of the inductor L11 and the one end of the inductor L12 are connected to a supply terminal for the terrestrial wave broadcast signals Terr (the output of the LNA 132). The one end of the inductor L11 and the other end of the inductor L12 are connected to the third signal line SL13 and fourth signal line SL14. An attenuator ATT41 is disposed on the third signal line SL13, and the output of the attenuator ATT41 is connected to the first terrestrial wave tuner 16 via a capacitor C41.

An attenuator ATT42 is connected to the fourth signal line SL14, and the output of the attenuator ATT42 is connected to the isolation amp unit 40. An attenuator ATT43 is disposed at the output side of the isolation amp unit 40. The output of the attenuator ATT43 is connected to the second terrestrial wave tuner 17 via a capacitor C42.

The isolation amp unit 40 has an n-p-n transistor Q41, and resistors R41, R42, and R43. The collector of the transistor Q41 is connected to a power source 50, and the emitter is connected to the ground GND (reference potential) via the resistor R41.

The resistors R42 and R43 are serially connected between the power source 50 and ground GND, and the connection node ND41 thereof is connected to the base of the transistor Q41 which is a control terminal, and the output of the attenuator ATT42.

Thus, the isolation amp unit 40 is formed of a common-collector transistor.

Due to employing such a configuration, in the case of sending signals to multiple terrestrial wave tuners from one second input terminal TI12 via the second splitter unit 13 and simultaneously receiving at these tuners, reception can be performed without problem, free of influence of disturbance waves. Reception without problem free of influence from disturbance waves leaking from the antenna terminal of one terrestrial wave tuner (television tuner) at the remaining television tuners is realized by including the common-collector transistor and attenuators on the signal line. Thus, according to the fourth embodiment, isolation between terminals is improved, and disturbance waves to other terminals are alleviated, thereby enabling reception with a weak electric field.

Note that the isolation amp unit 40 is not restricted to just the fourth signal line SL14, and can be disposed on the third signal line SL13 as well. Further, this may be disposed on the first signal line SL11 and second signal line SL12 as well.

Figure 14:
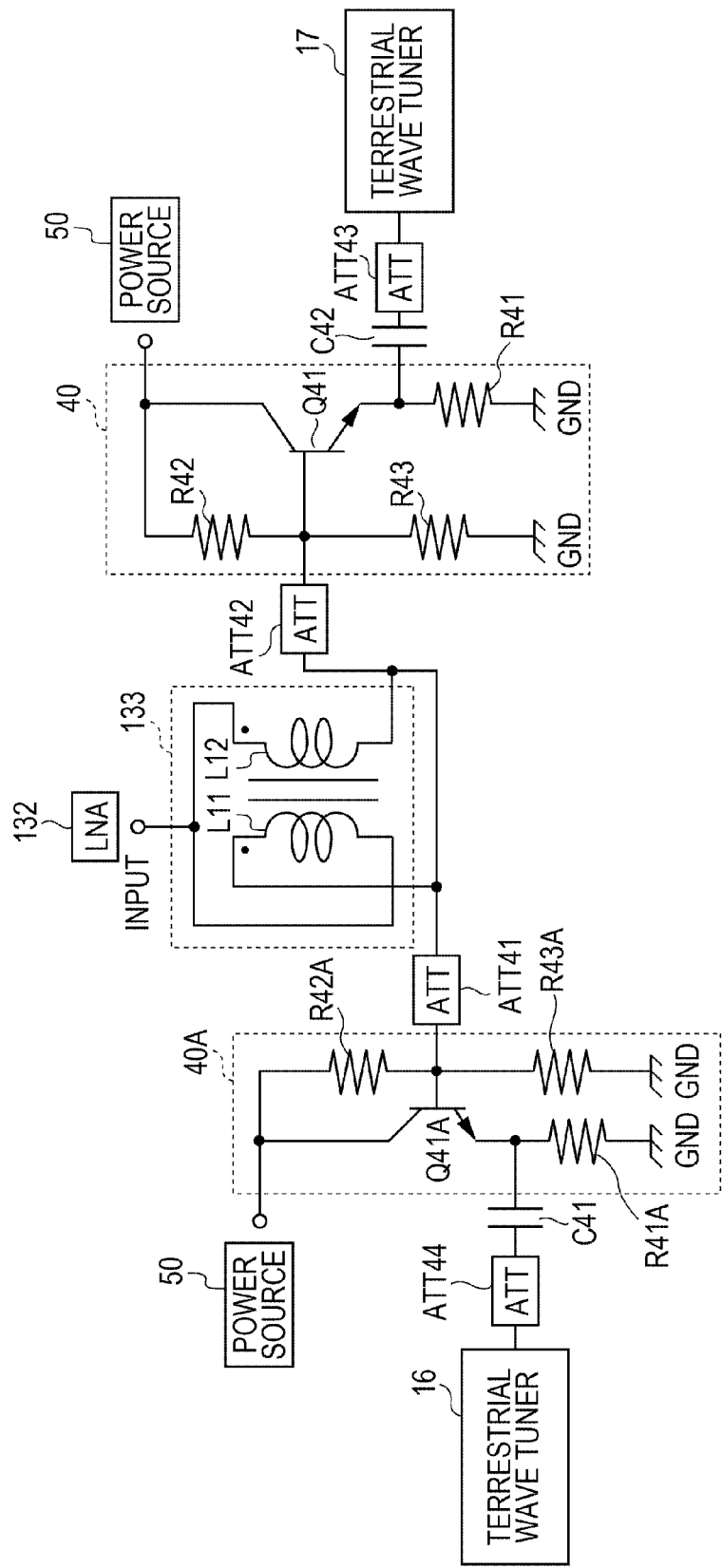
FIG. 14 is a diagram illustrating a second configuration example of a splitter device and isolation amplifier unit according to the present fourth embodiment.

FIG. 14 is diagram illustrating a second configuration example of a splitter device and isolation amp unit according to the present fourth embodiment.

With FIG. 14, an isolation amp unit 40A is disposed on the third signal line SL13 as well, in addition to the configuration shown in FIG. 13. The configuration thereof is the same as that of the isolation amp unit 40, and accordingly description thereof will be omitted. Also, an attenuator ATT44 is disposed between the inputs of the capacitor C41 and first terrestrial wave tuner 16. In this case, even in the event that the first terrestrial wave tuner 16 and second terrestrial wave tuner 17 are operated at the same time, each of the tuners can receive without problem, free of influence.

Figure 15:
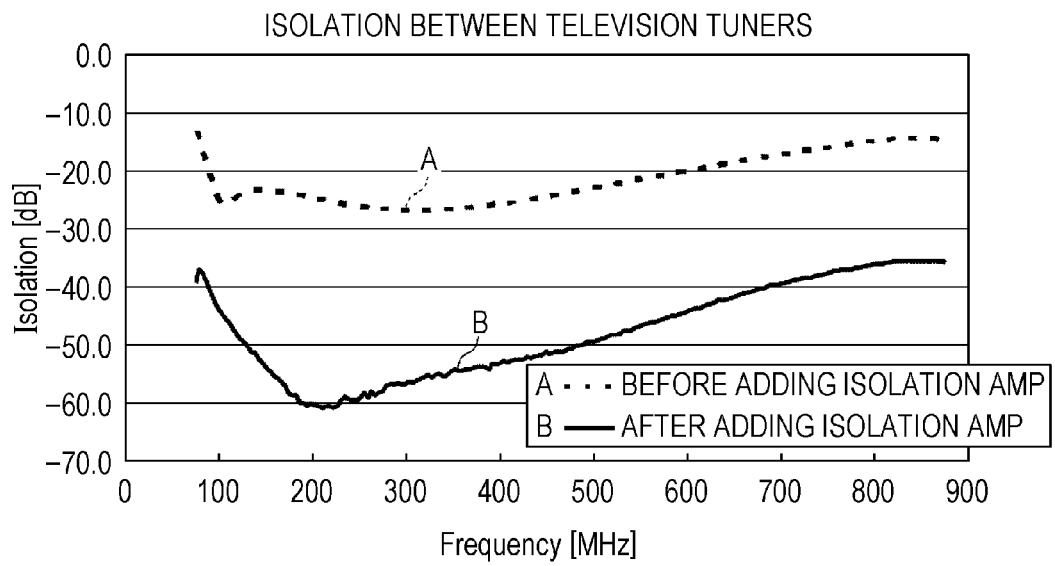
FIG. 15 is a diagram illustrating isolation properties among television tuners in the case of actually introducing an isolation improvement circuit.

FIG. 15 is a diagram illustrating isolation properties between television tuners in the event of actually introducing an isolation improving circuit. The curve indicated by the broken line A indicates the properties before introducing an isolation amp unit and the curve indicated by the solid line B indicates the properties after introducing the isolation amp unit. What were the properties of the broken line A curve have been improved to the properties of the solid line B curve. Further, employing a common-collector yields good distortion properties as compared with other ground types, and the peripheral circuit can be minimized and the circuit configured inexpensively. Further, voltage within the module can be used since high voltage is not necessary, so it can be said that this form is a circuit suitable for isolation improvement.

Figure 16:
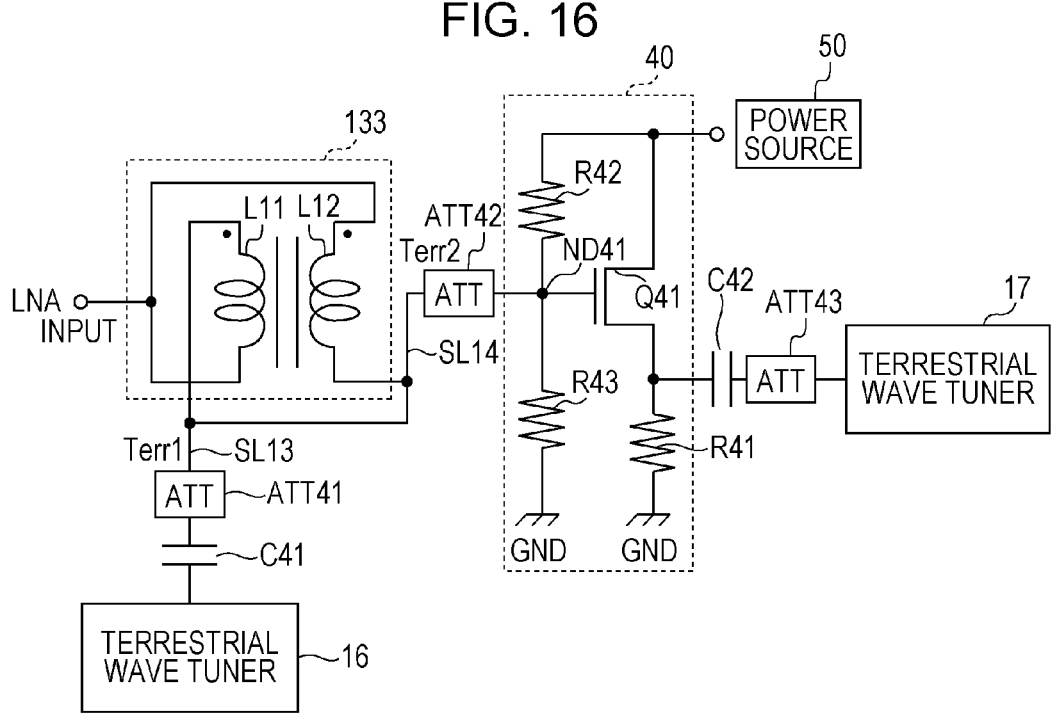
FIG. 16 is a diagram illustrating a third configuration example of a splitter device and isolation amplifier unit according to the present fourth embodiment.
Figure 17:
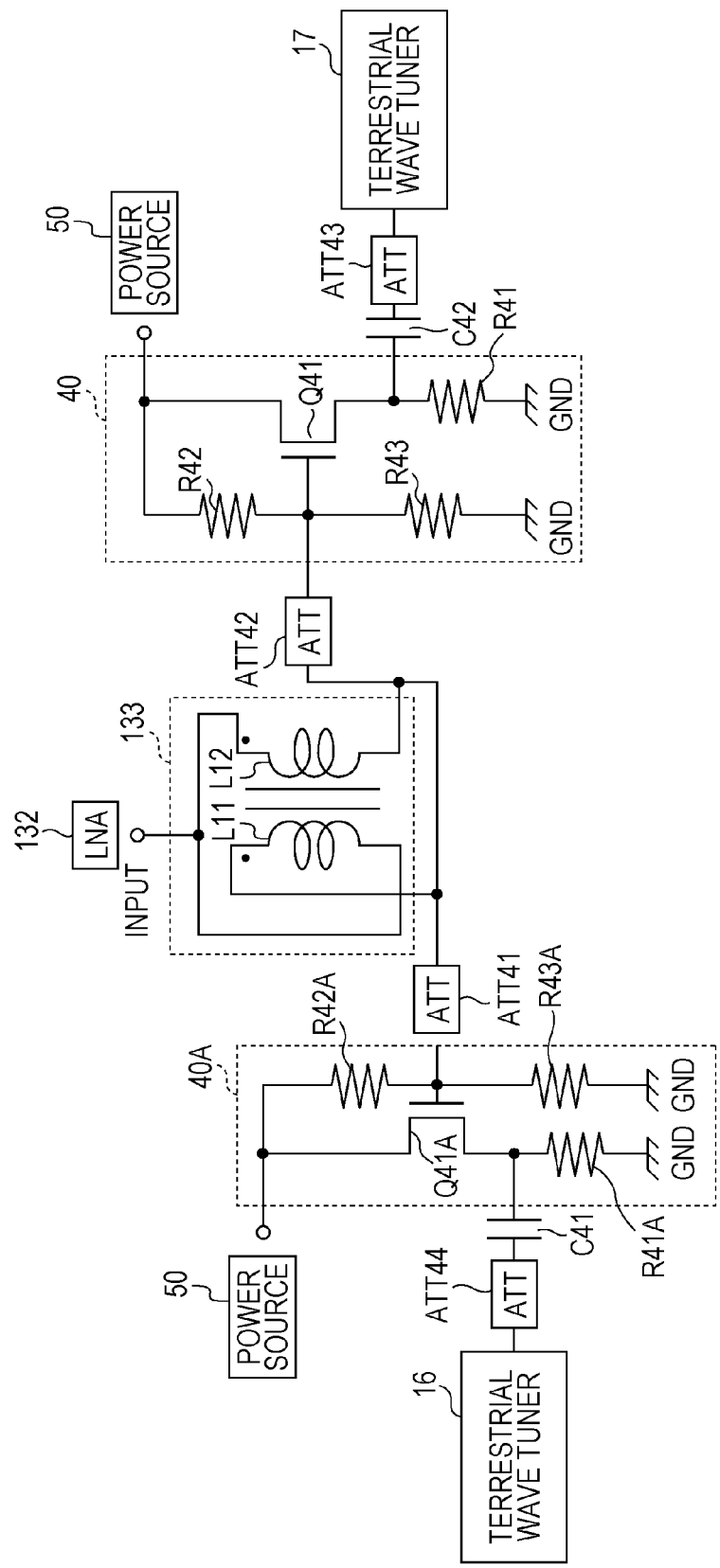
FIG. 17 is a diagram illustrating a fourth configuration example of a splitter device and isolation amplifier unit according to the present fourth embodiment.

Now, while a case of a common-collector using a bipolar transistor has been described above, a so-called common drain using a field effect transistor is also applicable as shown in FIG. 16 and FIG. 17, and the same advantages can be obtained.

At the time of simultaneous reception changing the intermediate frequency from the normal IFp=58.75 MHz to IFp=5.75 MHz for example, the local frequency of one television tuner may overlap the desired frequency band of another television tuner. The configuration of this fourth embodiment is effective in the event that such isolation is necessary. Also, regarding transistors for improving isolation, isolation properties at the UHF band can be secured by using straight type leads.

According to the fourth embodiment, disturbance waves leaking from each of multiple television tuners being operated to signal lines can be decreased to a level where there is no influence on reception at the other television tuners. As a result thereof, simultaneous reception at multiple television tuners without interference can be enabled.

Note that a case has been described where the receivers of the first through fourth embodiments are configured as modules, but these may be formed on circuit boards of set equipment as well.

Now, the first satellite wave tuner 14 and second satellite wave tuner 15 generally receive weak radio waves from one or two satellites. The intensity of the electric field of the weak radio waves that are received are proportionate to the distance from the satellite, so the first satellite wave tuner 14 and second satellite wave tuner 15 each receive multi-channel broadcast signals of almost the same reception power.

In contrast, the first terrestrial wave tuner 16 and second terrestrial wave tuner 17 normally receive multiple channels at the same time. The intensity of the electric field of the multiple channels that are received are markedly different one from another, in accordance with the distance from the radio station, transmitting the radio waves which are the channels, influence of obstruction, and so forth.

Accordingly, the reception power at the first terrestrial wave tuner 16 and second terrestrial wave tuner 17 is different for each channel being received. Broadcast signals corresponding to channels with weak reception power receive interference from broadcast signals corresponding to channels with great reception power, and problems such as distortion in signal waveforms and so forth occur.

Accordingly, in order to solve such problems with the first terrestrial wave tuner 16 and second terrestrial wave tuner 17, a great current is applied to the circuits configuring the first terrestrial wave tuner 16 and the second terrestrial wave tuner 17.

Accordingly, a wide dynamic range can be secured for broadcast signals corresponding to channels with weak reception power, and also the above-described problems can be alleviated.

However, in this case, with the first terrestrial wave tuner 16 and second terrestrial wave tuner 17, great current is applied to the circuits configuring these, so the circuit temperature thereof rises, which can lead to erroneous action of the circuits.

Accordingly, in the event of placing the first terrestrial wave tuner 16 and second terrestrial wave tuner 17 of which the circuit temperature rises adjacently, the circuit temperature of each other rises due to the heat emitted by each other.

Accordingly, as shown in FIG. 1, FIG. 6, and FIG. 12, the first terrestrial wave tuner 16 and second terrestrial wave tuner 17 are placed in a distanced manner so as to not be adjacent, thereby preventing a situation in which the temperatures of the circuits each rise.

Also, as shown in FIG. 1, FIG. 6, and FIG. 12, the first satellite wave tuner 14 and second satellite wave tuner 15 are provided between the first terrestrial wave tuner 16 and second terrestrial wave tuner 17, thereby efficiently using the space formed between the first terrestrial wave tuner 16 and second terrestrial wave tuner 17.

Note that the first satellite wave tuner 14 and second satellite wave tuner 15 do not need a great current as with the case of the first terrestrial wave tuner 16 and second terrestrial wave tuner 17, so the circuits of the first satellite wave tuner 14 and second satellite wave tuner 15 do not become hot even if situated next to each other, and erroneous operations do not occur.

While satellite wave tuners receiving SHF frequency band broadcast signals (the first satellite wave tuner 14 and second satellite wave tuner 15) have been provided to effectively use the space formed between the first terrestrial wave tuner 16 and second terrestrial wave tuner 17, as shown in FIG. 1, FIG. 6, and FIG. 12, other tuners may be provided.

That is to say, as shown in FIG. 18 for example, tuners receiving broadcast signals corresponding to any of long waves, medium waves, short waves, very high frequency waves, millimeter waves, or submillimeter waves, may be provided. Alternatively, circuits or the like other than tuners may be provided in the space formed between the first terrestrial wave tuner 16 and second terrestrial wave tuner 17, for example.

Note that while the first satellite wave tuner 14 and second satellite wave tuner 15 have been provided between the first terrestrial wave tuner 16 and second terrestrial wave tuner 17, the placement and number of tuners are not restricted to this.

That is to say, any placement method may be used as long as terrestrial wave tuners, of which circuits become hot since there is a need to apply great current, are situated so as to not be adjacent to each other.

That is to say, for example, in the event of providing two or more terrestrial wave tuners, for example, the two or more terrestrial wave tuners are situated so as to not be adjacent. In this case, one or more satellite wave tuners can be situated between each of the two or more terrestrial wave tuners. The placement of the satellite wave tuners should be such that the space formed between the terrestrial wave tuners can be efficiently used, and a linear array such as shown in FIG. 1, FIG. 6, and FIG. 12 is not necessarily necessary.

Also, in the event of providing one terrestrial wave tuner (e.g., the first terrestrial wave tuner 16 or second terrestrial wave tuner 17), for example, the first satellite wave tuner 14 and second satellite wave tuner 15 may be provided on either side thereof. These may be provided surrounding the one provided terrestrial wave tuner.

REFERENCE SIGNS LIST 10, 10A through 10C receivers
11, 11A, 11B module boards
12 first splitter unit
13 second splitter unit
14 first satellite wave tuner
15 second satellite wave tuner
16 first terrestrial wave tuner
17 second terrestrial wave tuner
18 digital/analog demodulator
19 digital demodulator
20 tuner module unit
30 power supply unit
40, 40A isolation amp units
ATT41 through ATT44 attenuators

The invention claimed is:

1. A receiver comprising:
  a first splitter unit operable to split analog or digital terrestrial wave broadcast signals;
  a second splitter unit operable to split satellite wave digital broadcast signals;
  a first reception unit and a second reception unit operable to receive said split analog or digital terrestrial wave broadcast signals; and
  one or more third reception units operable to receive said split satellite wave digital broadcast signals;
  wherein a first intermediate disposition reception unit and a second intermediate disposition reception unit are disposed between said first reception unit and said second reception unit as said one or more third reception units;
  a first input terminal to which said satellite wave digital broadcast signals are input;
  a second input terminal to which said analog or digital terrestrial wave broadcast signals are input;
  a first output terminal operable to output said satellite wave digital signals input from said first input terminal;
  a second output terminal operable to output said analog or digital terrestrial wave broadcast signals input from said second input terminal,
  wherein said first splitter is operable to:
    split said analog or digital terrestrial wave broadcast signals input from said second input terminal into first terrestrial wave broadcast signals and second terrestrial wave broadcast signals, and supply said input analog or digital terrestrial wave broadcast signals to said first output terminal; and
  wherein said second splitter unit is operable to:
    split said satellite wave digital broadcast signals input from said first input terminal into first satellite wave digital broadcast signals and second satellite wave digital broadcast signals, and supply said input satellite wave digital broadcast signals to said second output terminal;
  wherein said first intermediate disposition reception unit receives said first satellite wave broadcast signals split by said second splitter unit and performs frequency conversion thereof into first baseband signals; and
  wherein said second intermediate disposition reception unit receives said second satellite wave broadcast signals split by said second splitter unit and performs frequency conversion thereof into second baseband signals; and
  wherein said first reception unit receives said first terrestrial wave broadcast signals split by said first splitter unit and performs frequency conversion thereof into first intermediate frequency signals; and
  wherein said second reception unit receives said second terrestrial wave broadcast signals split by said first splitter unit and performs frequency conversion thereof into second intermediate frequency signals.

2. The receiver according to claim 1, further comprising:
  a first demodulator having demodulation functions of said first baseband signals from said first intermediate disposition reception unit and said first intermediate frequency signals from said first reception unit and a second demodulator having demodulation functions of said second baseband signals from said second intermediate disposition reception unit and said second intermediate frequency signals from said second reception unit.

3. The receiver according to claim 2, wherein said first demodulator has digital demodulation and analog demodulation functions;
  functions for demodulating video signals and audio signals of said first baseband signals to generate a first transport stream;
  functions for demodulating, in the event that said first intermediate frequency signals are signals where terrestrial wave digital broadcast signals have been frequency-converted, video signals and audio signals of said first intermediate frequency signals, to generate a second transport stream; and functions for demodulating, in the event that said first intermediate frequency signals are signals where terrestrial analog broadcast signals have been frequency-converted, video signals and audio signals of said first intermediate frequency signals, to generate analog video signals and analog audio signals.

4. The receiver according to claim 2 wherein said second demodulator has digital demodulation functions;
functions for demodulating video signals and audio signals of said second baseband signals to generate a third transport stream; and
functions for demodulating, in the event that said second intermediate frequency signals are signals where terrestrial wave digital broadcast signals have been frequency-converted, video signals and audio signals of said second intermediate frequency signals, to generate a fourth transport stream.

5. The receiver according to claim 4, further comprising:
a third output terminal configured to output a transport stream generated at said first demodulator;
a fourth output terminal configured to output a transport stream generated at said second demodulator;
a fifth output terminal configured to output analog video signals generated at said first demodulator; and
a sixth output terminal configured to output analog audio signals generated at said first demodulator;
wherein said first demodulator supplies said first transport stream or said second transport stream that has been generated to said third output terminal, and supplies the generated analog video signals to said fifth output terminal and supplies the generated analog audio signals to said sixth output terminal.

6. The receiver according to claim 2, wherein said first intermediate disposition reception unit, said second intermediate disposition reception unit, said first reception unit and said second reception unit are arrayed in parallel to the split output of said first splitter unit and said second splitter unit, arrayed with said first reception unit and said second reception unit which perform frequency conversion of said terrestrial wave broadcast signals disposed on the outer side of the parallel array, and said first intermediate disposition reception unit and said second intermediate disposition reception unit arrayed in parallel between the disposed portion of said first reception unit and the disposed portion of said second reception unit.

7. The receiver according to claim 6, wherein said first intermediate disposition reception unit, said second intermediate disposition reception unit, said first reception unit and said second reception unit, to be disposed in parallel, are disposed in the order of, from one outer side disposition portion, said first reception unit, said first intermediate disposition reception unit, said second intermediate disposition reception unit and said second reception unit.

8. The receiver according to claim 7, wherein said first demodulator and said second demodulator are disposed in parallel to the output of said first reception unit, said first intermediate disposition reception unit, said second intermediate disposition reception unit and said second reception unit, which are arrayed in parallel; and
wherein said first reception unit and said first intermediate disposition reception unit are arrayed in parallel such that the output sides face the input side of said first demodulator;
and wherein said second intermediate disposition reception unit and said second reception unit are arrayed in parallel such that the output sides face the input side of said second demodulator.

9. The receiver according to claim 6, wherein said first intermediate disposition reception unit, said second intermediate disposition reception unit, said first reception unit and said second reception unit, to be disposed in parallel, are disposed in the order of, from one outer side disposition portion, said first reception unit, said second intermediate disposition reception unit, said first intermediate disposition reception unit and said second reception unit.

10. The receiver according to claim 9, wherein said first demodulator and said second demodulator are disposed in parallel as to the output of said first reception unit, said second intermediate disposition reception unit, said first intermediate disposition reception unit and said second reception unit, which are arrayed in parallel; and
wherein said first reception unit and said second intermediate disposition reception unit are arrayed in parallel such that the output sides face the input side of said first demodulator; and
wherein said first intermediate disposition reception unit and said second reception unit are arrayed in parallel such that the output sides face the input side of said second demodulator.

11. The receiver according to claim 2, wherein said first splitter unit comprises:
a filter configured to remove spurious components of terrestrial wave broadcast signals input from said second input terminal,
an amplifier configured to amplify output signals from said filter, and
a splitter device configured to split output signals from said amplifier into said first terrestrial wave broadcast signals, said second terrestrial wave broadcast signals, and output terrestrial wave broadcast signals, said splitter device supplying said first terrestrial wave broadcast signals to said first reception unit, supplying said second terrestrial wave broadcast signals to said second reception unit and supplying said output terrestrial wave digital broadcast signals to said second output terminal.

12. The receiver according to claim 2, wherein said second splitter unit comprises:
a filter configured to remove spurious components of satellite wave digital broadcast signals input from said first input terminal, a first splitter device configured to split output signals from said filter into two satellite wave broadcast signals,
an amplifier configured to amplify one of said two satellite wave digital broadcast signals split at said first splitter device, and
a second splitter device configured to split output signals from said amplifier into said first satellite wave broadcast signals and said second satellite wave broadcast signals,
said first splitter device supplying the other of said two satellite wave broadcast signals to said first output terminal, and
said second splitter device supplying said first satellite wave broadcast signals to said first intermediate disposition reception unit, and supplying said second satellite wave broadcast signals to said second intermediate disposition reception unit.

13. The receiver according to claim 2, wherein said first splitter unit comprises:
a filter configured to remove spurious components of terrestrial wave broadcast signals input from said second input terminal, an amplifier configured to amplify output signals from said filter, and a splitter device configured to split output signals from said amplifier into said first terrestrial wave broadcast signals, said second terrestrial wave broadcast signals, and output terrestrial wave broadcast signals, said splitter device supplying said first terrestrial wave broadcast signals to said first reception unit, supplying said second terrestrial wave broadcast signals to said second reception unit and supplying said output terrestrial wave broadcast signals to said second output terminal.

14. The receiver according to claim 2, wherein said first splitter unit comprises:
a filter configured to remove spurious components of terrestrial wave broadcast signals input from said second input terminal,
a third splitter device configured to split output signals from said filter into two terrestrial wave broadcast signals,
an amplifier configured to amplify one of said two terrestrial wave broadcast signals split at said third splitter device, and
a fourth splitter device configured to split output signals from said amplifier into said first terrestrial wave broadcast signals and said second terrestrial wave broadcast signals,
said third splitter device supplying the other of said two terrestrial wave broadcast signals to said second output terminal, and
said fourth splitter device supplying said first terrestrial wave broadcast signals to said first reception unit and supplying said second terrestrial wave broadcast signals to said second reception unit.

15. The receiver according to claim 1, wherein said first reception unit, said second reception unit and one or more third reception units are arrayed in parallel on a module board; and
wherein said first reception unit and said second reception unit are arrayed on edge portions of said module board.

16. The receiver according to claim 1, further comprising:
a tuner module unit having said first reception unit, said second reception unit and said one or more third reception units, and a demodulator configured to demodulate video signals and audio signals from signals after frequency conversion at said first reception unit, said second reception unit and said one or more third reception units; and
a power supply unit configured to supply driving power to said tuner module unit;
wherein said tuner module unit and said power supply unit are disposed on a single board in a secluded manner; and
wherein said power supply unit comprises a plurality of regulators capable of supplying driving power to at least said first reception unit, said second reception unit and said one or more third reception units, and is capable of selectively supplying driving power to said first reception unit, said second reception unit and said one or more third reception units corresponding to said plurality of regulators in accordance with received broadcast signals.

17. The receiver according to claim 16, further comprising:
a first input terminal to which satellite wave digital broadcast signals are input; and
a second input terminal to which analog or digital terrestrial wave broadcast signals are input;
wherein said one or more third reception units comprise a first intermediate disposition reception unit and a second intermediate disposition reception unit; and
wherein said tuner module unit comprises:
a first splitter unit configured to split the terrestrial wave broadcast signals input from said second input terminal into first terrestrial wave broadcast signals and second terrestrial wave broadcast signals,
a second splitter unit configured to split the satellite wave digital broadcast signals input from said first input terminal into first satellite wave digital broadcast signals and second satellite wave digital broadcast signals,
wherein said first intermediate disposition reception unit is configured to receive said first satellite wave broadcast signals split by said second splitter unit and perform frequency conversion thereof into first baseband signals,
wherein said second intermediate disposition reception unit is configured to receive said second satellite wave broadcast signals split by said second splitter unit and perform frequency conversion thereof into second baseband signals,
wherein said first reception unit is configured to receive said first terrestrial wave broadcast signals split by said first splitter unit and perform frequency conversion thereof into first intermediate frequency signals,
wherein said second reception unit is configured to receive said second terrestrial wave broadcast signals split by said first splitter unit and perform frequency conversion thereof into second intermediate frequency signals;
a first demodulator having demodulation functions of said first baseband signals from said first intermediate disposition reception unit and said first intermediate frequency signals from said first reception unit; and
a second demodulator having demodulation functions of said second baseband signals from said second intermediate disposition reception unit and said second intermediate frequency signals from said second reception unit, and
wherein said power supply unit is capable of selectively supplying driving power to said first intermediate disposition reception unit, said second intermediate disposition reception unit, said first reception unit, and said second reception unit.

18. The receiver according to claim 17, wherein said power supply unit is capable of selectively supplying driving power in common to a plurality of reception units of said first intermediate disposition reception unit, said second intermediate disposition reception unit, said first reception unit, and said second reception unit, and has functions of holding in a sleep state, of said plurality of reception units to which driving power is supplied in common, frequency conversion units in a non-processing state as to received broadcast signals.

19. The receiver according to claim 17, wherein said first splitter unit comprises a first amplifier configured to amplify terrestrial wave broadcast signals input from said second input terminal, and wherein said second splitter unit comprises a second amplifier configured to amplify satellite wave digital broadcast signals input from said first input terminal, and
wherein said power supply unit is capable of selectively supplying driving power to said first amplifier and said second amplifier in accordance with received broadcast signals.

20. The receiver according to claim 17, further comprising:
a first output terminal configured to output satellite wave digital broadcast signals input from said first input terminal; and a second output terminal configured to output terrestrial wave broadcast signals input from said second input terminal, wherein said first splitter unit splits terrestrial wave broadcast signals input from said second input terminal into first terrestrial wave broadcast signals and second terrestrial wave broadcast signals, and supplies said input terrestrial wave broadcast signals to said second output terminal; and wherein said second splitter unit splits satellite wave digital broadcast signals input from said first input terminal into first satellite wave digital broadcast signals and second satellite wave digital broadcast signals, and supplies said input satellite wave digital broadcast signals to said first output terminal.

21. The receiver according to claim 17, wherein said first demodulator has digital demodulation and analog demodulation functions, functions for demodulating video signals and audio signals of said first baseband signals to generate a first transport stream, functions for demodulating, in the event that said first intermediate frequency signals are signals where terrestrial wave digital broadcast signals have been frequency-converted, video signals and audio signals of said first intermediate frequency signals, to generate a second transport stream, and functions for demodulating, in the event that said first intermediate frequency signals are signals where terrestrial analog broadcast signals have been frequency-converted, video signals and audio signals of said first intermediate frequency signals, to generate analog video signals and analog audio signals; and wherein said second demodulator has digital demodulation functions, functions for demodulating video signals and audio signals of said second baseband signals to generate a third transport stream; and functions for demodulating, in the event that said second intermediate frequency signals are signals where terrestrial wave digital broadcast signals have been frequency-converted, video signals and audio signals of said second intermediate frequency signals, to generate a fourth transport stream.

22. The receiver according to claim 21, further comprising:
a third output terminal configured to output said first transport stream or said second transport generated at said first demodulator;
a fourth output terminal configured to output said third transport stream or said fourth transport stream generated at said second demodulator;
a fifth output terminal configured to output said analog video signals generated at said first demodulator; and
a sixth output terminal configured to output said analog audio signals generated at said first demodulator.

23. The receiver according claim 17, wherein said first intermediate disposition reception unit, said second intermediate disposition reception unit, said first reception unit and said second reception unit are arrayed in parallel to the split output of said first splitter unit and said second splitter unit, arrayed with said first reception unit and said second reception unit which perform frequency conversion of said terrestrial wave broadcast signals disposed on the outer side of the parallel array, and arrayed with said first intermediate disposition reception unit and said second intermediate disposition reception unit arrayed in parallel between the disposed portion of said first reception unit and the disposed portion of said second reception unit.

24. The receiver according to claim 23, wherein said first intermediate disposition reception unit, said second intermediate disposition reception unit, said first reception unit and said second reception unit, to be disposed in parallel, are disposed in the order of, from one outer side disposition portion, said first reception unit, said first intermediate disposition reception unit, said second intermediate disposition reception unit and said second reception unit.

25. The receiver according to claim 23, wherein said first demodulator and said second demodulator are disposed parallel to said first reception unit, said first intermediate disposition reception unit, said second intermediate disposition reception unit and said second reception unit, which are arrayed in parallel; and wherein said first reception unit and said first intermediate disposition reception unit are arrayed in parallel such that the output sides face the input side of said first demodulator; and wherein said second intermediate disposition reception unit and said second reception unit are arrayed in parallel such that the output sides face the input side of said second demodulator.

26. The receiver according to claim 23, wherein said first intermediate disposition reception unit, said second intermediate disposition reception unit, said first reception unit and said second reception unit, to be disposed in parallel, are disposed in the order of, from one outer side disposition portion, said first reception unit, said second intermediate disposition reception unit, said first intermediate disposition reception unit and said second reception unit.

27. The receiver according to claim 26, wherein said first demodulator and said second demodulator are disposed in parallel as to output of said first reception unit, said second intermediate disposition reception unit, said first intermediate disposition reception unit and said second reception unit, which are arrayed in parallel; and wherein said first reception unit and said second intermediate disposition reception unit are arrayed in parallel such that the output sides face the input side of said first demodulator; and wherein said first intermediate disposition reception unit and said second reception unit are arrayed in parallel such that the output sides face the input side of said second demodulator.

28. The receiver according to claim 17, wherein said second splitter unit comprises:
a filter configured to remove spurious components of satellite wave digital broadcast signals input from said first input terminal,
a first amplifier configured to amplify output signals from said filter, and
a splitter device configured to split output signals from said first amplifier into said first satellite wave broadcast signals, said second satellite wave broadcast signals, and output satellite wave digital broadcast signals, said splitter device supplying said first satellite wave broadcast signals to said first intermediate disposition reception unit, supplying said second satellite wave broadcast signals to said second intermediate disposition reception unit and supplying said output satellite wave digital broadcast signals to said first output terminal.

29. The receiver according to claim 17, wherein said second splitter unit comprises:
a filter configured to remove spurious components of satellite wave digital broadcast signals input from said first input terminal,
a first splitter device configured to split output signals from said filter into two satellite wave broadcast signals,
a first amplifier configured to amplify one of said two satellite wave digital broadcast signals split at said first splitter device, and
a second splitter device configured to split output signals from said first amplifier into said first satellite wave broadcast signals and said second satellite wave broadcast signals, said first splitter device supplying the other of said two satellite wave broadcast signals to said first output terminal, and said second splitter device supplying said first satellite wave broadcast signals to said first intermediate disposition reception unit, supplying said second satellite wave broadcast signals to said second intermediate disposition reception unit.

30. The receiver according to claim 17, wherein said first splitter unit comprises:
 a filter configured to remove spurious components of terrestrial wave broadcast signals input from said second input terminal, a second amplifier configured to amplify output signals from said filter, and
 a splitter device configured to split output signals from said second amplifier into said first terrestrial wave broadcast signals, said second terrestrial wave broadcast signals, and output terrestrial wave broadcast signals, said splitter device supplying said first terrestrial wave broadcast signals to said first reception unit, supplying said second terrestrial wave broadcast signals to said second reception unit and supplying said output terrestrial wave broadcast signals to said second output terminal.

31. The receiver according to claim 17, wherein said first splitter unit comprises:
 a filter configured to remove spurious components of terrestrial wave broadcast signals input from said second input terminal,
 a third splitter device configured to split output signals from said filter into two terrestrial wave broadcast signals,
 a second amplifier configured to amplify one of said two terrestrial wave broadcast signals split at said third splitter device, and
 a fourth splitter device configured to split output signals from said second amplifier into said first terrestrial wave broadcast signals and said second terrestrial wave broadcast signals, said third splitter device supplying the other of said two terrestrial wave broadcast signals to said second output terminal, and said fourth splitter device supplying said first terrestrial wave broadcast signals to said first reception unit and supplying said second terrestrial wave broadcast signals to said second reception unit.

32. The receiver according to claim 1, further comprising:
 a splitter unit configured to split input broadcast signals into a plurality of broadcast signals;
 a tuner unit having said first reception unit and said second reception unit operable to perform frequency conversion of said received said split broadcast signals of said first frequency band and said one or more third reception units operable to perform frequency conversion of said received said split broadcast signals of said second frequency band; and
 an isolation amp unit disposed on at least one of a plurality of signal lines operable to propagate said split broadcast signals of said first frequency band split at said first splitter unit to said first reception unit and said second reception unit and said split broadcast signals of said second frequency bands split at said second splitter unit to said one or more third reception units;
 wherein said isolation amp unit has a buffer amp formed of a transistor where broadcast signals split at said splitter unit are input to a control terminal, and low-impedance output is performed by impedance transform.

33. The receiver according to claim 32, wherein said isolation amp unit has an attenuator disposed on at least one of the input side and output side of said buffer amp.

34. The receiver according to claim 32, further comprising:
 a first input terminal to which satellite wave digital broadcast signals are input;
 a second input terminal to which analog or digital terrestrial wave broadcast signals are input;
 a first output terminal configured to output satellite wave digital broadcast signals input from said first input terminal; and
 a second output terminal configured to output terrestrial wave broadcast signals input from said second input terminal;
 wherein said splitter unit comprises:
  said second splitter unit configured to split the satellite wave digital broadcast signals of said second frequency band input from said first input terminal into first satellite wave broadcast signals and second satellite wave broadcast signals, and also supply said input satellite wave digital broadcast signals to said first output terminal, and
  a first splitter unit configured to split the terrestrial wave broadcast signals of said first frequency band input from said second input terminal into first terrestrial wave broadcast signals and second terrestrial wave broadcast signals, and also supply said input terrestrial wave digital broadcast signals to said second output terminal; and wherein said one or more third reception units comprise of first intermediate disposition reception unit and second intermediate disposition reception unit; and
 wherein said tuner unit comprises:
  said first intermediate disposition reception unit configured to receive, via a first signal line, said first satellite wave broadcast signals split by said second splitter unit and perform frequency conversion thereof into first baseband signals,
  said second intermediate disposition reception unit configured to receive, via a second signal line, said second satellite wave broadcast signals split by said second splitter unit and perform frequency conversion thereof into second baseband signals,
 wherein said first reception unit is configured to receive, via a third signal line, said first terrestrial wave broadcast signals split by said first splitter unit and perform frequency conversion thereof into first intermediate frequency signals,
 wherein said second reception unit is configured to receive, via a fourth signal line, said second terrestrial wave broadcast signals split by said first splitter unit and perform frequency conversion thereof into second intermediate frequency signals; and
 wherein said isolation amp unit is disposed on at least one of said third signal line and said fourth signal line.

35. The receiver according to claim 34, wherein said first splitter unit comprises:
 a filter configured to remove spurious components of terrestrial wave broadcast signals input from said second input terminal,
 a first splitter device configured to split output signals from said filter into two terrestrial wave broadcast signals,
 an amplifier configured to amplify one of said two terrestrial wave broadcast signals split at said first splitter device, and
 a second splitter device configured to split output signals from said first amplifier into said first terrestrial wave broadcast signals and said second terrestrial wave broadcast signals, said first splitter device supplying the other of said two terrestrial wave broadcast signals to said second output terminal, and said second splitter device supplying said first terrestrial wave broadcast signals to said first reception unit via said third signal line, and supplying said second terrestrial wave broadcast signals to said second reception unit via said fourth signal line.

36. The receiver according to claim 34, wherein said second splitter unit comprises:
a filter configured to remove spurious components of satellite wave digital broadcast signals input from said first input terminal,
an amplifier configured to amplify output signals from said filter, and
a splitter device configured to split output signals from said amplifier into said first satellite wave broadcast signals, said second satellite wave broadcast signals, and output satellite wave digital broadcast signals, said splitter device supplying said first satellite wave broadcast signals to said first intermediate disposition reception unit via said first signal line, supplying said second satellite wave broadcast signals to said second intermediate disposition reception unit via said second signal line, and supplying said output satellite wave digital broadcast signals to said first output terminal.

37. The receiver according to claim 34, wherein said second splitter unit comprises:
a filter configured to remove spurious components of satellite wave digital broadcast signals input from said first input terminal,
a third splitter device configured to split output signals from said filter into two satellite wave broadcast signals,
an amplifier configured to amplify one of said two satellite wave digital broadcast signals split at said third splitter device, and
a fourth splitter device configured to split output signals from said amplifier into said first satellite wave broadcast signals and said second satellite wave broadcast signals,
wherein said third splitter device supplies the other of said two satellite wave broadcast signals to said first output terminal, and said second splitter device supplies said first satellite wave broadcast signals to said first intermediate disposition reception unit via said first signal line, supplying said second satellite wave broadcast signals to said second intermediate disposition reception unit via said second signal line.

38. The receiver according to claim 34, wherein said tuner unit comprises:
a first demodulator having demodulation functions of said first baseband signals from said first intermediate disposition reception unit and said first intermediate frequency signals from said first reception unit and
a second demodulator having demodulation functions of said second baseband signals from said second intermediate disposition reception unit and said second intermediate frequency signals from said second reception unit;
wherein said first demodulator having digital demodulation and analog demodulation functions, functions for demodulating video signals and audio signals of said first baseband signals to generate a first transport stream, functions for demodulating, in the event that said first intermediate frequency signals are signals where terrestrial wave digital broadcast signals have been frequency-converted, video signals and audio signals of said first intermediate frequency signals, to generate a second transport stream, and functions for demodulating, in the event that said first intermediate frequency signals are signals where terrestrial analog broadcast signals have been frequency-converted, video signals and audio signals of said first intermediate frequency signals, to generate analog video signals and analog audio signals, and
wherein said second demodulator having digital demodulation functions, functions for demodulating video signals and audio signals of said second baseband signals to generate a third transport stream, and functions for demodulating, in the event that said second intermediate frequency signals are signals where terrestrial wave digital broadcast signals have been frequency-converted, video signals and audio signals of said second intermediate frequency signals, to generate a fourth transport stream.

39. The receiver according to claim 38, further comprising:
a third output terminal configured to output said first transport stream and said second transport stream generated at said first demodulator;
a fourth output terminal configured to output said third transport stream and said fourth transport stream generated at said second demodulator;
a fifth output terminal configured to output analog video signals generated at said first demodulator; and
a sixth output terminal configured to output analog audio signals generated at said first demodulator.

40. The receiver according to claim 34, wherein said first intermediate disposition reception unit, said second intermediate disposition reception unit, said first reception unit and said second reception unit are arrayed in parallel to said first splitter unit and said second splitter unit, arrayed with said first reception unit and said second reception unit which perform frequency conversion of said terrestrial wave broadcast signals disposed on the outer side of the parallel array, and arrayed with said first intermediate disposition reception unit and said second intermediate disposition reception unit arrayed in parallel between the disposed portion of said first reception unit and the disposed portion of said second reception unit.

41. The receiver according to claim 40, wherein said first intermediate disposition reception unit, said second intermediate disposition reception unit, said first reception unit and said second reception unit, to be disposed in parallel, are disposed in the order of, from one outer side disposition portion, said first reception unit, said first intermediate disposition reception unit, said second intermediate disposition reception unit and said second reception unit.

42. The receiver according to claim 41, wherein said first demodulator and said second demodulator are disposed in parallel as to the output of said first reception unit, said first intermediate disposition reception unit, said second intermediate disposition reception unit and said second reception unit, which are arrayed in parallel; and
wherein said first reception unit and said first intermediate disposition reception unit are arrayed in parallel such that the output sides face the input side of said first demodulator; and
wherein said second intermediate disposition reception unit and said second reception unit are arrayed in parallel such that the output sides face the input side of said second demodulator.

43. The receiver according to claim 40, wherein said first intermediate disposition reception unit, said second intermediate disposition reception unit, said first reception unit and said second reception unit, to be disposed in parallel, are disposed in the order of, from one outer side disposition portion, said first reception unit, said second intermediate disposition reception unit, said first intermediate disposition reception unit and said second reception unit.

44. The receiver according to claim 43, wherein said first demodulator and said second demodulator are disposed in parallel as to the output of said first reception unit, said second intermediate disposition reception unit, said first intermediate disposition reception unit and said second reception unit, which are arrayed in parallel; and wherein said first reception unit and said second intermediate disposition reception unit are arrayed in parallel such that the output sides face the input side of said first demodulator; and wherein said first intermediate disposition reception unit and said second reception unit are arrayed in parallel such that the output sides face the input side of said second demodulator.

* * * * *